US007689738B1

(12) United States Patent
Williams et al.

(10) Patent No.: US 7,689,738 B1
(45) Date of Patent: Mar. 30, 2010

(54) PERIPHERAL DEVICES AND METHODS FOR TRANSFERRING INCOMING DATA STATUS ENTRIES FROM A PERIPHERAL TO A HOST

(75) Inventors: Robert Alan Williams, Cupertino, CA (US); Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1421 days.

(21) Appl. No.: 10/676,758

(22) Filed: Oct. 1, 2003

(51) Int. Cl.
*G06F 3/00* (2006.01)
*G06F 13/00* (2006.01)

(52) U.S. Cl. .................... 710/52; 710/53; 710/54; 710/55; 710/56; 710/57; 711/100

(58) Field of Classification Search .................. None
See application file for complete search history.

(56) References Cited

U.S. PATENT DOCUMENTS

| 4,658,351 A | 4/1987 | Teng |
| 5,043,981 A | 8/1991 | Firoozmand et al. |
| 5,223,606 A | 6/1993 | Blaudin de The et al. |
| 5,375,223 A | 12/1994 | Meyers et al. |
| 5,491,811 A * | 2/1996 | Arimilli et al. .............. 711/144 |
| 5,513,320 A | 4/1996 | Young et al. |
| 5,521,916 A | 5/1996 | Choudhury et al. |
| 5,586,297 A * | 12/1996 | Bryg et al. .................. 711/143 |
| 5,633,865 A | 5/1997 | Short |
| 5,724,358 A | 3/1998 | Headrick |
| 5,745,790 A | 4/1998 | Oskouy |
| 5,805,816 A | 9/1998 | Picazo, Jr. et al. |
| 5,812,774 A | 9/1998 | Kempf et al. |
| 5,828,901 A | 10/1998 | O'Toole et al. |
| 5,852,719 A | 12/1998 | Fishler et al. |
| 5,870,627 A | 2/1999 | O'Toole et al. |
| 5,915,104 A * | 6/1999 | Miller ........................ 710/310 |
| 6,012,118 A | 1/2000 | Jayakumar et al. |
| 6,049,842 A | 4/2000 | Garrett et al. |
| 6,070,194 A | 5/2000 | Yu et al. |

(Continued)

OTHER PUBLICATIONS

Office Action for U.S. Appl. No. 10/816,656 Mailed Nov. 15, 2007.

(Continued)

*Primary Examiner*—Alan Chen
(74) *Attorney, Agent, or Firm*—Eschweiler & Associates, LLC

(57) ABSTRACT

Methods and systems are provided for reducing partial cache writes in transferring incoming data status entries from a peripheral device to a host. The methods comprise determining a lower limit on a number of available incoming data status entry positions in an incoming data status ring in the host system memory, and selectively transferring a current incoming data status entry to the host system memory using a full cache line write if the lower limit is greater than or equal to a first value. Peripheral systems are provided for providing an interface between a host computer and an external device or network, which comprise a descriptor management system adapted to determine a lower limit on a number of available incoming data status entry positions in an incoming data status ring in a host system memory, and to selectively transfer a current incoming data status entry to the host system memory using a full cache line write if the lower limit is greater than or equal to a first value.

31 Claims, 17 Drawing Sheets

U.S. PATENT DOCUMENTS

| | | | |
|---|---|---|---|
| 6,091,734 A | 7/2000 | Suzuki et al. | |
| 6,145,016 A | 11/2000 | Lai et al. | |
| 6,182,164 B1 | 1/2001 | Williams | |
| 6,182,165 B1 | 1/2001 | Spilo | |
| 6,199,124 B1 | 3/2001 | Ramakrishnan et al. | |
| 6,212,593 B1 * | 4/2001 | Pham et al. | 710/266 |
| 6,304,911 B1 | 10/2001 | Brcich et al. | |
| 6,324,595 B1 | 11/2001 | Tsai et al. | |
| 6,327,615 B1 | 12/2001 | Kasper | |
| 6,334,162 B1 * | 12/2001 | Garrett et al. | 710/54 |
| 6,401,145 B1 | 6/2002 | Baskey et al. | |
| 6,515,993 B1 | 2/2003 | Williams et al. | |
| 6,529,945 B1 | 3/2003 | Calhoun et al. | |
| 6,570,876 B1 | 5/2003 | Aimoto | |
| 6,581,113 B1 | 6/2003 | Dwork et al. | |
| 6,732,209 B1 | 5/2004 | Cherukuri et al. | |
| 6,842,821 B2 | 1/2005 | Nystuen | |
| 6,891,835 B2 | 5/2005 | Kalkunte et al. | |
| 6,970,921 B1 * | 11/2005 | Wang et al. | 709/220 |
| 7,016,302 B1 | 3/2006 | Schramm et al. | |
| 7,047,531 B2 | 5/2006 | Dorland et al. | |
| 7,274,792 B2 | 9/2007 | Chin et al. | |
| 2002/0009075 A1 | 1/2002 | Fesas, Jr. | |
| 2002/0013821 A1 | 1/2002 | Kasper | |
| 2002/0188742 A1 | 12/2002 | Nie | |
| 2002/0194415 A1 | 12/2002 | Lindsay | |
| 2005/0213603 A1 | 9/2005 | Karighattam et al. | |

OTHER PUBLICATIONS

Response to Office Action for U.S. Appl. No. 10/816,656, filed Feb. 14, 2008.

* cited by examiner

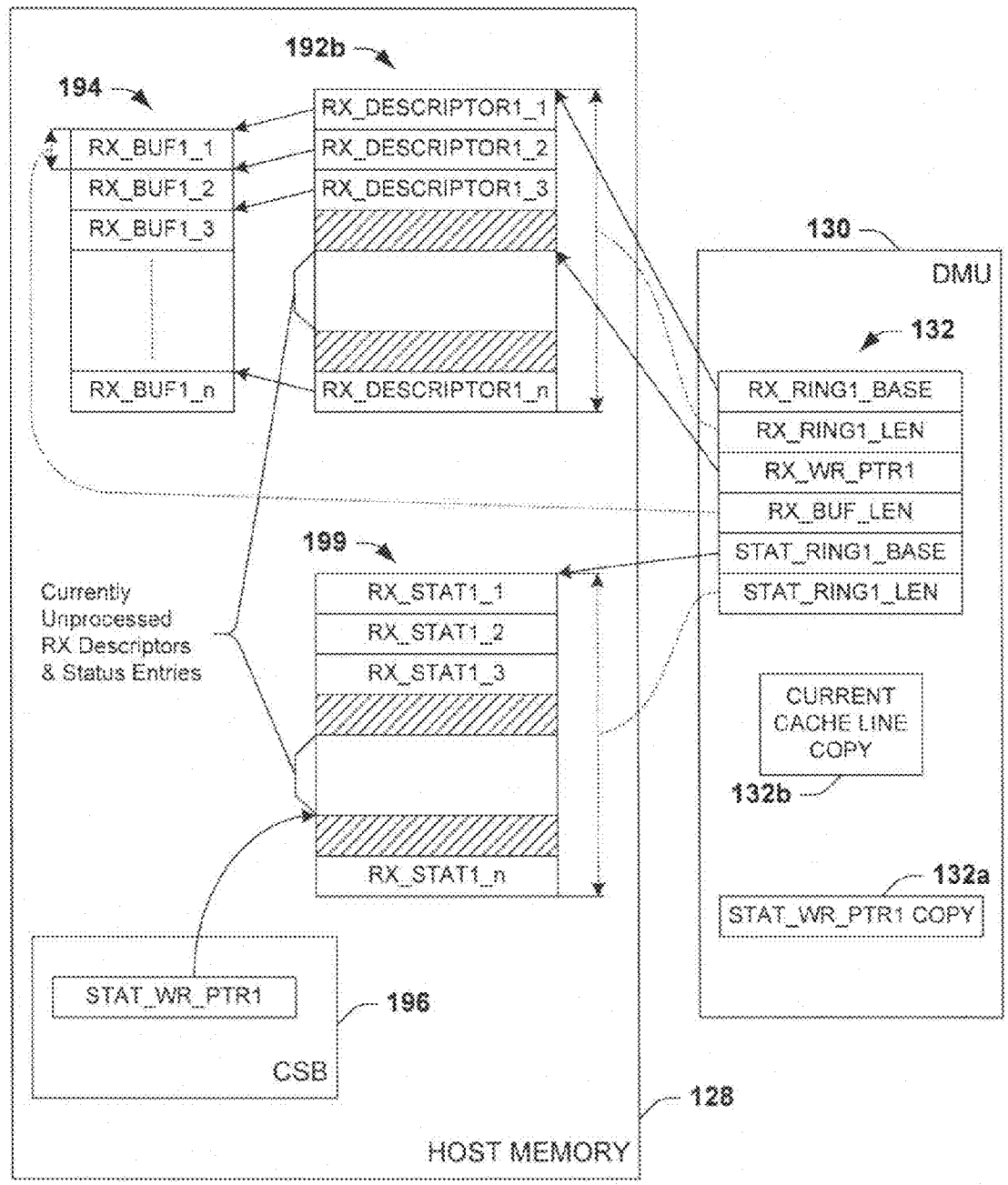

PERIPHERAL DEVICES AND METHODS FOR TRANSFERRING INCOMING DATA STATUS ENTRIES FROM A PERIPHERAL TO A HOST

RELATED APPLICATION

This application is related to U.S. patent application Ser. No. 10/676,759 filed on Oct. 1, 2003, which is entitled DESCRIPTOR MANAGEMENT SYSTEMS AND METHODS FOR TRANSFERRING DATA BETWEEN A HOST AND A PERIPHERAL.

FIELD OF INVENTION

The invention is generally related to the field of computer devices and more particularly to methods and systems for interfacing a host device or system with an external device or network.

BACKGROUND OF THE INVENTION

Many computer systems, such as personal computers, often need to communicate and otherwise interact with external devices or systems, such as networks, printers, and other I/O devices. Peripheral systems, such as network interface controllers, I/O controllers, etc., are accordingly provided within the computer system to provide an interface between the host computer processor and the external devices. Such peripheral systems and other components are typically situated to transfer data via one or more buses, where the peripheral systems are typically cards or circuit boards in the host computer system. The host processor and the peripheral systems exchange data in order to facilitate interfacing software programs running in the host processor with external I/O, including networks.

Host-computing systems, such as personal computers, are often operated as nodes on a communications network, where each node is capable of receiving data from the network and transmitting data to the network. Data is transferred over a network in groups or segments, wherein the organization and segmentation of data are dictated by a network operating system protocol, and many different protocols exist. In fact, data segments that correspond to different protocols can co-exist on the same communications network. In order for a node to receive and transmit information packets, the node is equipped with a peripheral network interface controller, which is responsible for transferring information between the communications network and the host system. For transmission, the host processor constructs data or information packets in accordance with a network operating system protocol and passes them to the network peripheral. In reception, the host processor retrieves and decodes packets received by the network peripheral. The host processor performs many of its transmission and reception functions in response to instructions from an interrupt service routine associated with the network peripheral. When a received packet requires processing, an interrupt may be issued to the host system by the network peripheral. The interrupt has traditionally been issued after either all of the bytes in a packet or some fixed number of bytes in the packet have been received by the network peripheral.

Many computer systems include a peripheral bus, such as a peripheral component interconnect (PCI or PCI-X) bus for exchanging data between the host processor and high throughput peripheral and other devices, such as memory, network interfaces, display, and disk drives. The host processor and memory can be directly or indirectly connected to the PCI bus along with other devices, such as graphic display adapters, disk controllers, sound cards, etc., where such devices may be coupled directly or indirectly (e.g., through a host bridge) to the PCI or PCI-X bus. In other configurations, the peripheral systems and the main host system memory are connected to the PCI-X bus, wherein a peripheral systems may operate as PCI-X bus master capable of direct memory access (DMA) operations to transfer data to and from the host memory. The host processor interacts with the PCI-X bus and main host system memory via a memory controller, and the host system may further include a cache memory for use by the host processor.

Direct transfer of data between a host processor and a peripheral across the host system bus is generally costly in terms of host processor utilization or efficiency and cache management. For example, during processor I/O read operations, the host processor must wait idle for the read result. Where the peripheral interrupts the host processor, for example, the host must read interrupt information form the interrupting peripheral via an I/O read operation across the system bus to retrieve interrupt information for servicing the interrupt. In many computer systems, some data is passed between the host processor and the peripherals using a shared memory in the host system, such as a main host memory connected to the system bus. In transferring certain data, the host processor and the peripheral access predetermined locations in the shared memory. In this manner, the host processor and the peripheral need not communicate directly for all information exchange therebetween.

However, in conventional computer systems, the processor and peripheral still use direct communications across the system bus to exchange a certain amount of information, such as data relating to the locations of shared memory data buffers and control and status information. In addition, in conventional shared memory designs, updating control information used to facilitate the transfer of data through the shared memory causes excessive cache data line transfers. A network controller or other peripheral system typically needs to write status or other information to the shared host system memory for consumption by the host processor. For example, a network controller peripheral may write information to a receive status location in the shared memory, which indicates the status of frame data received from a network by the peripheral.

Even where a descriptor system allows the network peripheral to write the receive status information to the system memory without host CPU intervention (e.g. using direct memory access (DMA) techniques), the status information for a received frame is generally much shorter than the length of a cache line. For instance, the receive status entry for a particular frame may be only 8 bytes long, whereas a cache line can be 64 bytes long or more. In such a case, each cache line will hold multiple status entries, and writing a single status entry results in a partial cache line write operation. In a partial cache line write, a memory/cache controller has to read the entire cache line (e.g., 64 bytes) out of the system memory, merge the new data in (e.g., merge in the 8 bytes status entry while preserving the non-updated portions of the cache line), and write the entire updated cache line (e.g., 64 bytes) back into the system memory.

Because a memory read operation, a data merge operation, and a memory write operation are required, partial cache line writes are particularly costly in terms of overall system efficiency and bus bandwidth. Partial cache line writes also disturb the normal pattern of memory access operations. In normal operation of the host system, the host processor reads and writes full cache lines. For a CPU read, if the desired data is not in the cache, then the memory/cache controller reads it from the system memory and puts it in the cache. The CPU writes data into the cache, and the cache data may be subsequently copied to the system memory when the cache is flushed to make room for other data. This type of CPU/ memory interaction typically results in a stream of memory reads and a stream of memory writes. However, the read/ modify/write operations associated with a partial cache line write from a peripheral disturb the normal pattern of read and write streams. This interruption in the normal data flow between the host processor and the system memory adversely impacts the system bandwidth. Therefore, it is desirable to minimize or avoid partial cache line write operations from the peripheral to the system memory.

One possible solution to avoid partial cache writes is to make the status information as large as the cache line size. However, this approach results in large amounts of wasted memory. Accordingly, there remains a need for improved data transfer methods and systems to facilitate improved bus bandwidth utilization and to improve system efficiency in transferring data from peripherals to a host memory in computer systems.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later. The invention relates to network controllers and other peripheral devices, as well as methods for transferring incoming (e.g., receive) data status information entries or other data from the peripheral to a host memory, in which partial cache line writes are reduced, thereby improving system efficiency and system bus bandwidth.

In one aspect of the invention, a method is provided for transferring data entries from a peripheral to a data queue in a host memory. The method comprises determining a lower limit on a number of available data entry positions calculated by adding the number of unused data entry positions in the data queue, and selectively transferring a current data entry to the host memory using a full cache line write if the lower limit is greater than or equal to a first value, the first value taking on the value of the number of unused status entry positions remaining in the cache line. The method may be employed in transferring any type of data from the peripheral to the host memory, for example, incoming (e.g., receive) data status entries including information related to the status of one or more data frames received by the peripheral from a network.

In one implementation illustrated and described below, the data entries are incoming data status entries having lengths smaller than a cache line, where the data queue is an incoming data status ring in the host memory. In this example, a lower limit on a number of available incoming data status entry positions in the incoming data status ring is determined, and a current incoming data status entry is selectively transferred to the host memory using a full cache line write if the lower limit is greater than or equal to the first value. Where the lower limit is less than the first value, the incoming data status entry is transferred to the host memory using a partial cache line write. The lower limit determination thus allows the use of full cache line writes to improve system efficiency and throughput without the risk of overwriting receive status entries that have not been processed by the host CPU.

The method may be implemented in a descriptor management system in the peripheral that can determine the lower limit and the first value using information already in the peripheral, without having to read additional descriptors from the host memory. The first value can be any value related to the cache line size, such as the number of unused incoming data status entry positions remaining in a current cache line, or simply the number of incoming data status entries per cache line. Using either of these exemplary metrics, the method ensures that a full cache line write will not inadvertently overwrite entries in the queue that the host has not yet processed.

The lower limit may be determined using data already available in the peripheral, such as the number of unused incoming data descriptors and/or according to a number of unused incoming data status entry positions remaining for a current incoming data descriptor. In one particular implementation illustrated and described below, the lower limit is the sum of the number of unused incoming data descriptors and the number of unused incoming data status entry positions remaining for the current incoming data descriptor minus 1. The descriptor management system can calculate the number of unused incoming data descriptors, for example, as the difference between an incoming data status pointer and an incoming data descriptor write pointer stored in the peripheral.

Where the lower limit is greater than or equal to the first value, the method thus provides full cache line writes to transfer a current incoming data status entry or other data entry to the host memory queue. For transferring receive status entries into a receive status ring queue, the peripheral may not know whether the host has processed the previous entries in the status ring cache line. Accordingly, one implementation of the method provides for selectively transferring the current incoming data status entry and any previous incoming data status entries for the current cache line to the host memory using a full cache line write. The remaining portions of the cache line may be padded with zeros or any other data, since the host will not be expecting valid data in the data entry positions following the current entry. Accordingly, the peripheral may maintain a current cache line copy including all the previously written status entries for that cache line. Thereafter, if another status entry is to be written to the same cache line of the status ring, it is added to a current cache line copy, and the entire current cache line copy is written to the host memory using a full cache line write.

In another aspect of the invention, a peripheral system is provided, such as a network controller or other peripheral, comprising a descriptor management system. The descriptor management system is adapted to determine a lower limit on a number of available data entry positions in a data queue in a host memory, and to selectively transfer a current data entry to the host memory using a full cache line write if the lower limit is greater than or equal to a first value. In a network controller illustrated and described below, the data entries are incoming data status entries and the data queue is an incoming data status ring in the host memory. In this implementation, the descriptor management system determines a lower limit on a number of available incoming data status entry positions in the incoming data status ring, and selectively transfers a current incoming data status entry to the host memory using a full cache line write if the lower limit is greater than or equal to the first value. If the lower limit is less than the first value, the descriptor management system uses a partial line write to transfer the current incoming data status entry to the host memory.

To the accomplishment of the foregoing and related ends, the following description and annexed drawings set forth in detail certain illustrative aspects and implementations of the invention. These are indicative of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 5G is a schematic diagram illustrating an exemplary receive descriptor in the network interface system of FIG. 2;

FIG. 5H is a schematic diagram illustrating an exemplary receive descriptor ring and receive status ring in the host memory, as well as pointer registers in the descriptor management system of the network interface system of FIG. 2;

FIGS. 7A-7D illustrate the contents of an exemplary current cache line copy in the descriptor management system of the present invention as receive status entries are written to the receive status ring in the host memory.

DETAILED DESCRIPTION OF THE INVENTION

Figure 1A:
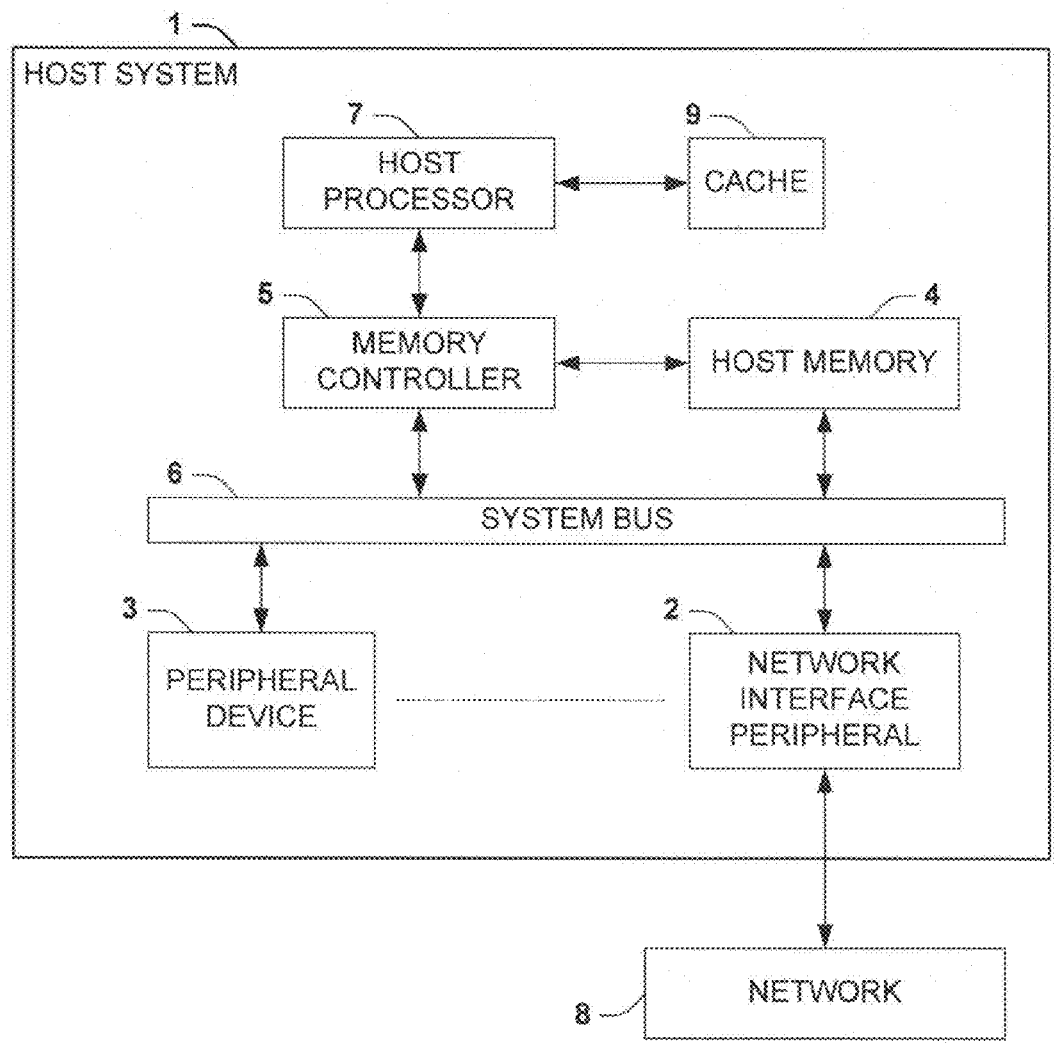
FIG. 1A is a schematic diagram illustrating an exemplary computer system having one or more peripheral devices in which one or more aspects of the present invention may be carried out.

One or more implementations of the present invention will now be described with reference to the drawings, wherein like reference numerals are used to refer to like elements throughout.

Figure 1B:
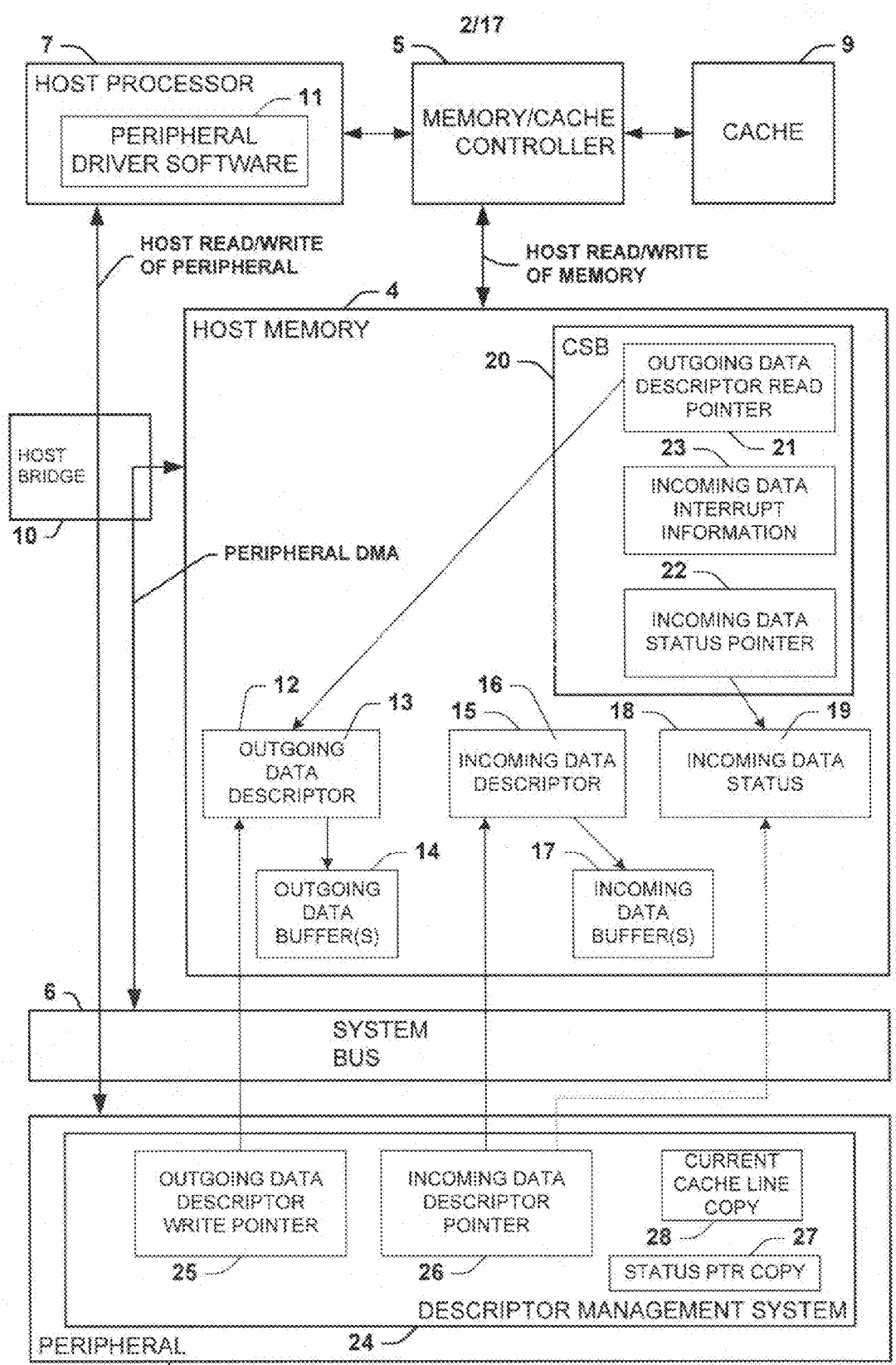
FIG. 1B is a schematic diagram illustrating an exemplary descriptor management system for facilitating communications between a host processor and a peripheral device in accordance with the invention.

Referring initially to FIGS. 1A and 1B, a host system 1 is illustrated having peripherals 2 and 3 in which one or more aspects of the present invention may be carried out. The host system 1 comprises a system bus 6 to which various components in the system are coupled, including a network peripheral 2 or other peripheral 3, a shared host main memory 4, a host bridge 10, and a memory/cache controller 5. The host bridge 10 interfaces the bus 6 with a host processor 7, which is also coupled with the host memory 4 via the memory/cache controller 5 (FIG. 1B). The network peripheral 2 interfaces the host processor with an external LAN or other type network 8, and one or more other peripherals 3 interface the host processor 7 with external devices (not shown). The host system 1 also comprises a cache memory 9, which may be operated as a write-back cache or a write-through cache for improving processor efficiency, wherein the memory controller 5 may also operate as a cache controller.

Several aspects of the invention are hereinafter illustrated and described in the context of the exemplary network interface peripheral 2, which may be implemented as a single chip network controller with various interface devices, connectors, power circuitry, etc. on a network interface card (NIC) coupled to the system bus 6 in the host system 1. However, the features of the invention are generally applicable to other types of peripherals, wherein the descriptor management aspects illustrated and described herein may be employed for exchanging data between any peripheral and a host such as the host processor 7. Further, the features of the invention may be employed in association with any host system in which any bus architecture, memory systems, and memory/cache controllers are used, wherein all such applications and implementations are contemplated as falling within the scope of the invention and the appended claims.

As illustrated in FIG. 1B, the host processor comprises peripheral driver software 11, which may communicate with the host memory 4 using the memory/cache controller 5 and the network peripheral 2 via the host bridge 10. The driver 11 provides interface functionality to interface the host processor and other software running therein (e.g., upper layers in a network stack) with the network interface peripheral 2, which in turn, interfaces the driver 11 with an external network (e.g., network 8 of FIG. 1A). While the host processor 7 and the driver 11 may quickly communicate with the host memory 4 via the memory controller 5 and/or the host bridge 10, communication with the peripheral 2 via the system bus 6 is less efficient. Such communication is performed using I/O read and write operations, wherein I/O read operations are particularly costly in terms of processor efficiency since the host processor 7 must wait for a response by the peripheral 2.

In accordance with the present invention, a descriptor system is provided for transferring incoming data from the peripheral 2 to the host processor 7 and the driver software 11 therein, and for transferring outgoing data from the host 7 to the peripheral 2 using the host system memory 4. In the illustrated implementation, the descriptor system and the host memory 4 are used primarily for transferring outgoing (transmit) data from the driver 11 in the host 7 to the network peripheral 2 for transmission to the network 8 (FIG. 1A) and for transferring incoming (received) data from the network 8 from the network peripheral 2 to the driver 11. However, the descriptor systems and methods of the invention may be employed for transferring any type of data between a host and a peripheral.

The exemplary descriptor system comprises various queues for information exchange between the host 7 and the peripheral 2 including descriptor and status rings organized as contiguous blocks of memory locations or registers operated as circular memory rings in the host memory 4, wherein the first location in the block is considered to follow the last register. The memory locations in a descriptor or status ring need not be contiguous and other configurations are possible within the scope of the present invention. An outgoing data descriptor ring 12 in the shared memory stores outgoing data descriptors 13 indicating locations of outgoing data buffers 14, and an incoming data descriptor ring 15 stores incoming data descriptors 16 indicating locations of incoming data buffers 17 in the host memory 4. An incoming data status ring queue 18 stores incoming data status entries 19 corresponding to incoming data in the incoming data buffers 17.

The descriptor system also provides a control status block (CSB) 20 in the host memory 4. The CSB includes memory locations or registers in the host memory 4, which the host 7 and the driver 11 therein can access using fast memory read operations. The CSB 20 comprises an outgoing data descriptor read pointer 21, which indicates a location of an outgoing data descriptor 13 in the outgoing data descriptor ring 12. The pointer 21 and other pointers in the present invention may be a physical address of one of a particular descriptor 13 in the ring 12, or may be an offset from the address of the first location in the ring 12, or any other value indicative of the particular descriptor 13. The outgoing data descriptor read pointer 21 indicates a number of outgoing data buffers 14 to which the host processor 7 or the driver 11 therein can write outgoing data. In one implementation illustrated and described below, the pointer 21 is written by the peripheral 2 to indicate a descriptor 13 in the ring 12 just beyond the last outgoing descriptor 13 that the peripheral has processed. In this example, the host 7 can proceed to fill outgoing data buffers 14 and corresponding descriptors 13 until the location of the descriptor identified by the pointer 21 without having to directly communicate with the peripheral 2.

With respect to incoming (receive) data, the CSB 20 further comprises an incoming data status pointer 22, which indicates a location of an incoming data status entry 19 in the incoming data status ring 18, as well as incoming data interrupt information 23. The incoming data status pointer 22 points to a particular status entry 19, such as by direct address or as an offset into the status ring 18, wherein the particular entry 19 addressed by the pointer 22 indicates a number of incoming data buffers 17 from which the host 7 or the driver 11 can read incoming data. In one example, the pointer 22 is written by the peripheral 2 to indicate a status entry 19 just past the last status entry 19 written by the peripheral, wherein the peripheral 2 maintains a copy 27 of the pointer 22 as described below. In this example, the host 7 and/or the driver 11 therein can proceed to process incoming data by reading the status ring entries 19 and the incoming data from the corresponding buffers 17 until the location of the descriptor identified by the pointer 22 without having to directly communicate with the peripheral 2. For incoming data, the peripheral 2 writes the incoming data interrupt information 23 to the CSB 20 and interrupts the host processor 7 to indicate that one or more incoming data status entries 19 and corresponding data in the buffers 17 are ready to be read and processed by the host 7. The host 7, in turn, can read the interrupt information 23 upon being interrupted, without costly I/O reads to obtain this information from the peripheral 2. In this manner, the incoming data status pointer 22 and the interrupt information 23 allow the host to process incoming data using only fast memory read operations without direct intervention by the peripheral 2.

In the peripheral 2, a descriptor management system or unit 24 is provided, which may comprise logic circuitry and memory registers in the peripheral 2. The descriptor management system 24 comprises an outgoing data descriptor write pointer 25 and an incoming data descriptor pointer 26, implemented as memory registers in the exemplary peripheral 2. The outgoing data descriptor write pointer 25 is written by the host processor 7 and indicates a location of an outgoing data descriptor 13 in the outgoing data descriptor ring 12 and indicates a number of outgoing data buffers 14 from which the peripheral 2 can read outgoing data. The incoming data descriptor pointer 26 is also written by the host 7 and indicates a location of an incoming data descriptor 16 in the incoming data descriptor ring 15, wherein the incoming data descriptor pointer 26 indicates a number of incoming data buffers 17 to which the peripheral 2 can write incoming data. In the exemplary peripheral 2, the incoming data descriptors 16 in the incoming data descriptor ring 15 may individually indicate the location of a plurality of incoming data buffers 17 in the host memory 4 to reduce bus bandwidth usage.

With respect to outgoing data, the host processor 7 or the peripheral driver software 11 therein is adapted to read a current outgoing data descriptor read pointer 21 from the CSB 20, and to write outgoing data to one or more outgoing data buffers 14 according to the current outgoing data descriptor read pointer 21. The host 7 writes one or more outgoing data descriptors 13 to the outgoing data descriptor ring 12 according to the current outgoing data descriptor read pointer 21, and writes an updated outgoing data descriptor write pointer 25 to the descriptor management system 24 in the peripheral 2 according to the number of outgoing data buffers 14 to which outgoing data was written.

The peripheral 2 reads one or more outgoing data descriptors 13 from the descriptor ring 12 according to the updated outgoing data descriptor write pointer 25, and reads outgoing data from one or more outgoing data buffers 14 in accordance therewith. The peripheral 2 then writes an updated outgoing data descriptor read pointer 21 to the CSB 20 according to the number of outgoing data buffers 14 from which the peripheral 2 has read outgoing data. The updated outgoing data descriptor write pointer 25 in the descriptor management system 24 comprises an address in the host memory 4 indicating a location in the outgoing data descriptor ring 12 just beyond the most recent outgoing data descriptor 13 written to the descriptor ring 12 by the host 7. The updated outgoing data descriptor read pointer 21 in the CSB 20 comprises an address in the memory 4 indicating a location in the outgoing data descriptor ring 12 just beyond the most recent outgoing data descriptor 13 read by the peripheral 2.

In this manner, the outgoing data descriptor read pointer indicates a number of outgoing data buffers 14 to which the host 7 can write outgoing data, and the outgoing data descriptor write pointer 25 indicates a number of outgoing data buffers 14 from which the peripheral 2 can read outgoing data. Consequently, the peripheral 2 and the host 7 can proceed in generally autonomous fashion to transfer outgoing data from the host 7 to the peripheral 2, while mitigating excessive bus bandwidth usage.

For transfer of incoming data from the peripheral 2 to the host 7, the peripheral 2 reads one or more incoming data descriptors 16 from the incoming data descriptor ring 15 according to a current incoming data descriptor pointer 26. The peripheral 2 then writes incoming data to one or more incoming data buffers 17 according to the descriptors 13, and writes one or more incoming data status entries 19 in the incoming data status ring 18 according to the one or more incoming data descriptors 16. The peripheral 2 then writes an updated incoming data status pointer 22 to the CSB 20 according to the number of incoming data buffers 17 that were written by the peripheral 2. In accordance with the present invention, the descriptor management system 24 maintains a copy 27 of the incoming data status pointer 22 written to the CSB 20, as well as a current cache line copy 28 to store the current and past incoming data status entries 19 written to the incoming data status ring 18.

The host 7 reads the updated incoming data status pointer 22 and reads one or more incoming data status entries 19 from the status ring 18 according to the updated pointer 22. The host 7 reads incoming data from one or more incoming data buffers 17 according to the updated pointer 22 and writes an updated incoming data descriptor pointer 26 to the descriptor management system 24 according to the number of incoming data buffers 17 from which the host 7 has read incoming data. In the exemplary descriptor system, the updated incoming data status pointer 22 in the CSB 20 comprises a memory address indicating a location in the incoming data status ring 18 just beyond the most recent incoming data status entry 19 written by the peripheral 2. The updated incoming data descriptor pointer 26 in the descriptor management system 24 of the peripheral 2 comprises a memory address indicating a location in the incoming data descriptor ring 15 just beyond the most recent incoming data descriptor 16 written by the host 7.

In this manner, the incoming data status pointer 22 indicates the number of incoming data buffers 17 from which the host can read incoming data, and the incoming data descriptor pointer indicates a number of incoming data buffers 17 to which the peripheral 2 can write incoming data. In the illustrated example, the exemplary CSB 20 is smaller than or equal to a cache line size for the cache memory 9. Furthermore, the exemplary peripheral 2 updates the entire cache line containing the CSB 20 in the host memory 4 in a single write operation, thereby reducing memory bandwidth usage and mitigating the number of cache line invalidations.

In the illustrated example, the incoming data status entries 19 written to the status ring 18 are smaller than a cache line length for the cache memory 9. To reduce the number of partial cache line writes for transferring the entries 19 to the queue (status ring 18), the descriptor management system 24 determines a lower limit on a number of available data entry positions in the status ring 18, and selectively transfers a current incoming data status entry 19 to the status ring 18 in the host memory 4 using a full cache line write if the lower limit is greater than or equal to a first value. Otherwise, the status entries 19 are written to the status ring 18 via partial cache line writes. The lower limit determination avoids overwriting receive status entries that have not been processed by the host CPU 7, because the peripheral 2 ensures that the remainder of the current cache line to be written does not contain unprocessed data. In the examples illustrated and described herein, the peripheral 2 decides when to perform such full cache line writes using pointer information already stored in the peripheral 2 without having to read additional descriptors 16 from the host memory 4.

The lower limit is determined using the number of unused incoming data descriptors 16 and/or according to a number of unused incoming data status entry positions remaining for a current incoming data descriptor 16 (e.g., where a single incoming data descriptor 16 is associated with multiple incoming data buffers 17). For example, in the system illustrated in FIG. 1B, the descriptor management system 24 calculates the lower limit as the sum of the number of unused incoming data descriptors 16 and the number of unused incoming data status entry positions remaining for the current incoming data descriptor 16 minus 1. In this implementation, the descriptor management system 24 subtracts the incoming data status pointer 26 from the incoming data descriptor write pointer copy 27 stored in the peripheral 2 to determine the number of unused (e.g., available) incoming data descriptors 16. Thus, although the peripheral 2 does not know the exact amount of incoming data buffers 17 and status entries 19 processed by the host 7, a lower limit is computed to ensure that a fill cache line write to the incoming data status ring 18 will not corrupt unprocessed status entries 19 therein.

In this regard, the lower limit can be compared to any value indicative of whether the target cache line includes unprocessed entries. In one example, the descriptor management system compares the calculated lower limit to the number of unused incoming data status entry positions remaining in a current cache line. Thus, for example, if the current status entry 19 is targeted to be written to the 6th entry position in a current cache line capable of holding 8 such entries 19, the descriptor management system 24 can compute the lower limit and determine whether this number is greater than or equal to 3 (e.g., 8 entries per cache line minus currently unused entry positions 6, 7, and 8). If so, a full cache line write is used to transfer the current incoming data status entry 19 into the status ring 18 (e.g., together with copies of the previously stored entries 19 in positions 1 through 5 of the current cache line).

In this manner, the invention ensures that no important data exists in entry positions 7 or 8, and also ensures that the potentially unprocessed status entries 19 in the preceding entry positions 1-5 are not corrupted. Thus, the resulting cache line in the queue 18 of the host memory 4 appears to the host 7 as though a partial cache line write has occurred (without the bandwidth and efficiency penalties for the reading, merging, and writing of an actual partial cache line write), wherein the pre-existing data of importance (e.g., entry positions 1-5) has been maintained and where the new data (e.g., the current status entry 19 in position 6 of the cache line) has been added. In another possible implementation, the lower limit can be simply compared to the number of incoming data status entries per cache line (e.g., 8 in this example). Using either of these exemplary metrics or another first value that is less than or equal to the number of incoming data status entries 19 per cache line, the invention ensures that a full cache line write will not inadvertently overwrite entries in the queue that the host has not yet processed, and at the same time avoid at least some partial cache line writes when the queue 18 is not fill.

In constructing the data to be transferred in such a fill cache line write, the descriptor management system 24 maintains a copy 28 of the current cache line associated with the incoming data status entries 19 being written. For the first entry 19 written to a cache line, the descriptor management system 24 optionally clears the copy 28 to all zeros (e.g., or any other data), and writes the current entry 19 to the first entry position in the copy 28. If a full cache line write is done (e.g., based on comparing the lower limit with the first value), the entire contents of the current cache line copy 28 is transferred to the corresponding location in the host memory queue 18 as a full cache line. Thereafter, as one or more further entries 19 need to be written to the same cache line in the queue 18, these are added to the next available entry positions in the copy 28. Thus, at any given time, the copy 28 will include all zeros or one or more incoming data status entries 19, with zeros following the last entry 19 written to the queue 18 until the entire cache line has been written, as illustrated and described further with respect to FIGS. 7A-7D below.

Further, the exemplary descriptor system may be configured to accommodate multiple quality of service (QOS) priority levels of incoming and/or outgoing data. In the exemplary system of FIGS. 1A and 1B, a plurality of outgoing data descriptor rings 12, incoming data descriptor rings 15, and incoming data status rings 18 are provided in the host memory 4. Individual outgoing data descriptor rings 12 correspond to an outgoing data priority and store outgoing data descriptors 13 indicating locations of outgoing data buffers 14 in the host memory 4. With respect to incoming data, individual incoming data descriptor rings 15 correspond to incoming data priorities and store incoming data descriptors 15 indicating locations of incoming data buffers 17 and individual incoming data status rings 18 are likewise associated with a corresponding incoming data priority, where the status rings 18 store incoming data status entries 19 accordingly. The incoming data descriptors 16, moreover, may each point to a plurality of incoming data buffers 17, wherein a corresponding plurality of status entries 19 are provided in the status rings 18.

For QOS support, the CSB 20 comprises a plurality of outgoing data descriptor read pointers 21 and a plurality of incoming data status pointers 22. Individual outgoing data descriptor read pointers 21 correspond to an outgoing data priority and indicate a number of outgoing data buffers to which the host can write outgoing data associated with the corresponding outgoing data priority. The individual incoming data status pointers 22 are likewise individually associated with a corresponding incoming data priority and indicate a number of incoming data buffers 17 from which the host 7 can read incoming data for the corresponding incoming data priority. In the peripheral 2, the descriptor management system 24 comprises a plurality of outgoing data descriptor write pointers 25 individually associated with a corresponding outgoing data priority, which indicate a number of outgoing data buffers 14 from which the peripheral 2 can read outgoing data for the corresponding outgoing data priority. In addition, the system 24 comprises a plurality of incoming data descriptor pointers 26, each associated with a corresponding incoming data priority. The pointers 26 individually indicate a number of incoming data buffers 17 to which the peripheral 2 can write incoming data for that priority. In addition, the descriptor management system 24 comprises a plurality of current cache line copies 28 and incoming data status pointers 27 individually associated with a corresponding incoming data priority.

Figure 1C:
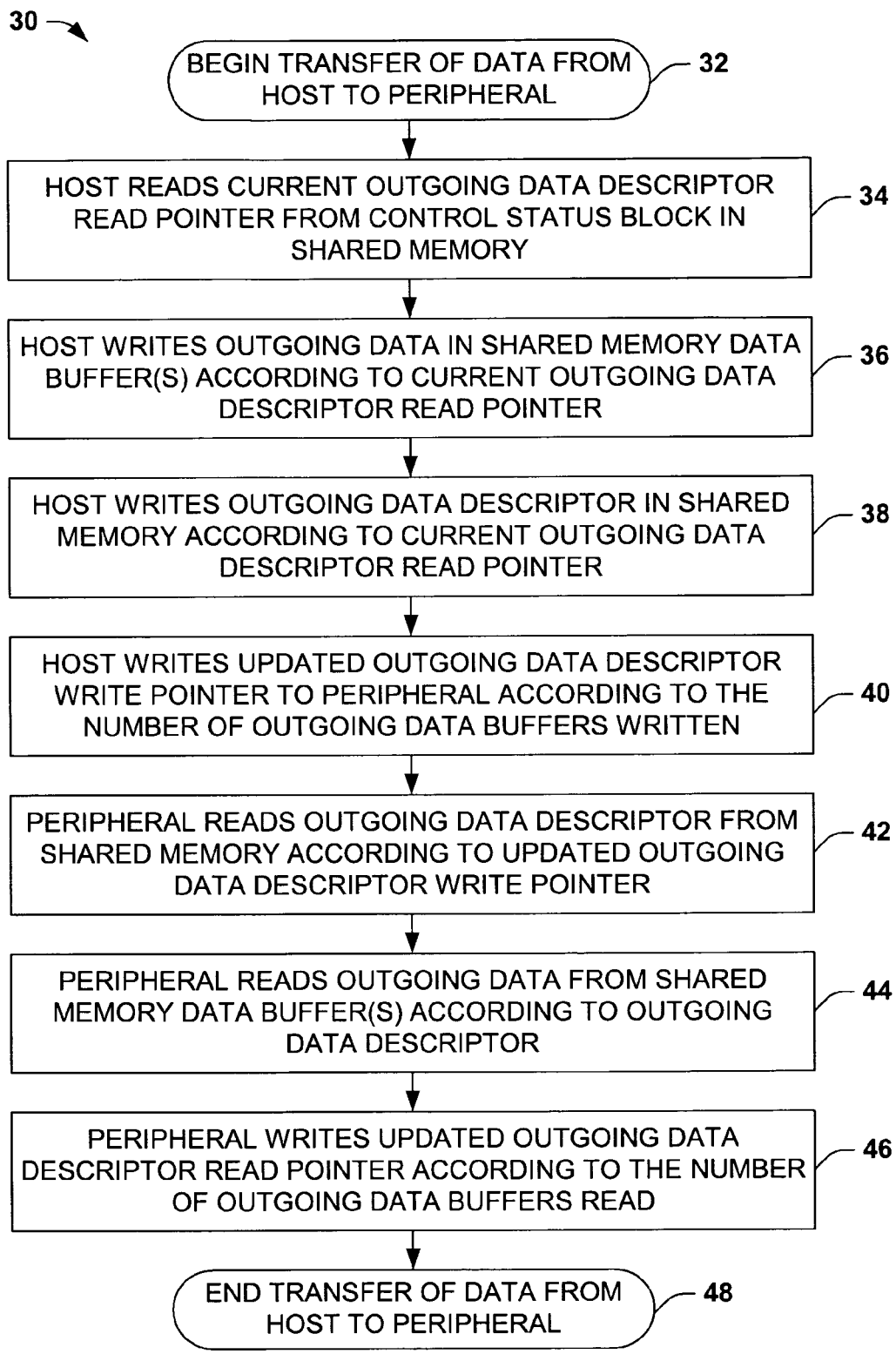
FIG. 1C is a flow diagram illustrating an exemplary method of transferring outgoing data from a host to a peripheral using the descriptor system of FIG. 1B.
Figure 1D:
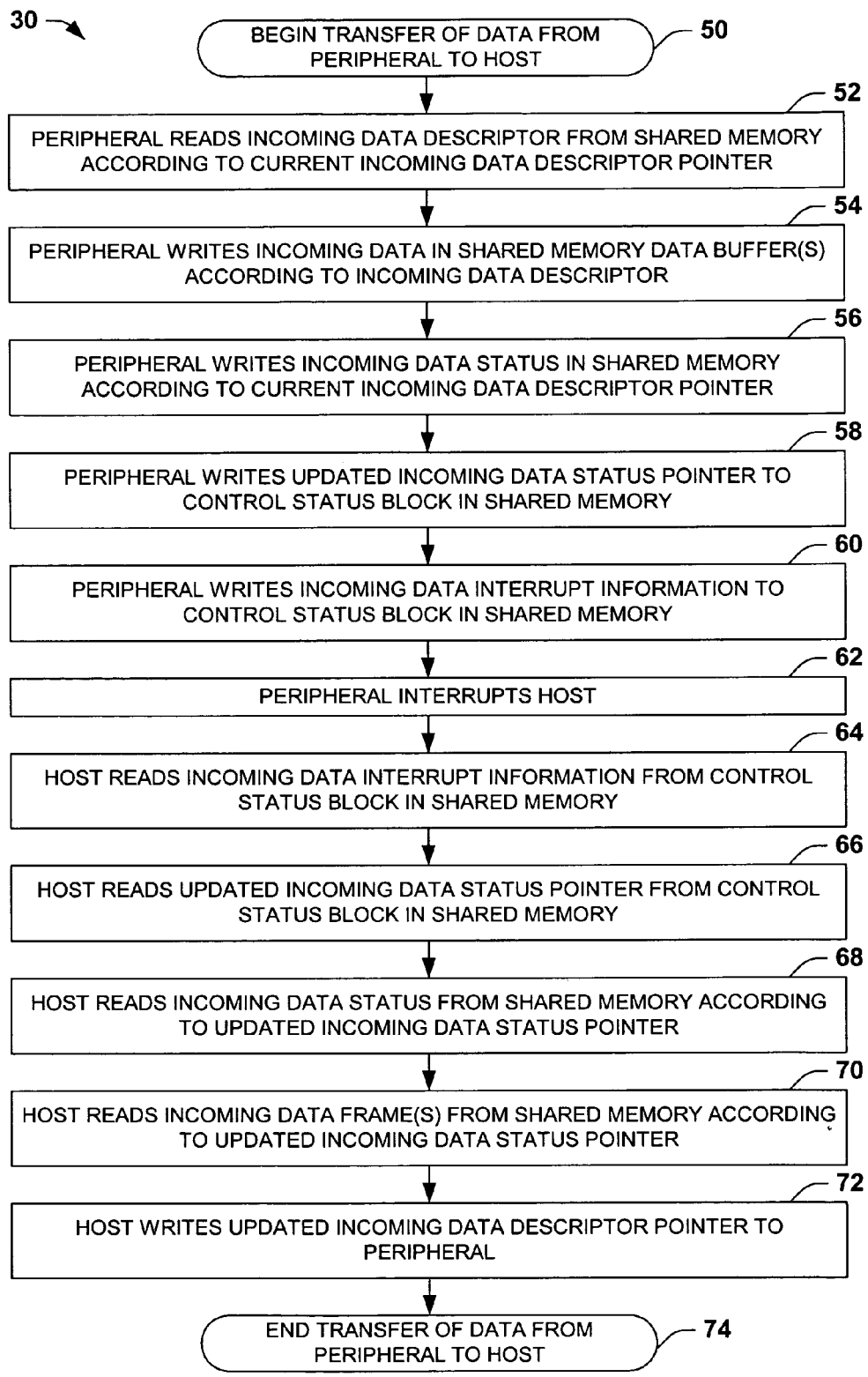
FIG. 1D is a flow diagram illustrating an exemplary method of transferring incoming data and status entries from the peripheral to the host using the descriptor system of FIG. 1B.

FIG. 1C provides a flow chart 30 illustrating transfer of outgoing data from the host 7 or the driver 11 therein to the peripheral 2 above using the exemplary descriptor system, and FIG. 1D illustrates transfer of incoming data from the peripheral 2 to the host 7, wherein the transfer of outgoing and incoming data between the host 7 and the peripheral 2 may occur concurrently. In FIG. 1C, outgoing data transfer operation begins at 32, where the host 7 reads a current outgoing data descriptor read pointer 21 from the CSB 20 at 34 and writes outgoing data to shared memory data buffers 14 in accordance therewith at 36. At 38, the host 7 writes the outgoing data descriptor 13 in the host memory 4 according to the number of outgoing buffers 14 written by the host 7. At 40, the host 7 writes updated outgoing data descriptor write pointer 25 within the peripheral 2 according to the number of outgoing data buffers 14 written by the host 7.

At 42, the peripheral 2 reads an outgoing data descriptor 13 according to the updated outgoing data descriptor write pointer 25, and reads outgoing data from the buffers 14 in accordance therewith at 44. At 46, the peripheral 2 writes an updated outgoing data descriptor read pointer 21 in the CSB 20 according to the number of outgoing data buffers 14 read by the peripheral 2, whereafter the outgoing data transfer ends at 48. Where multiple priority (e.g., QOS) support is provided, the outgoing data flow may proceed generally as indicated in 34-46 above, with higher priorities generally being serviced first. For example, the peripheral 2 may suspend transfer of lower priority outgoing data until some or all higher priority data has been transferred. Outgoing queues in the peripheral 2 are generally serviced in a strict priority basis (a low priority queue is not serviced until all higher priority rings have been serviced) except that the peripheral 2 may be programmed to prevent a continuous stream of high priority traffic from completely blocking all lower priority traffic.

Incoming data transfer from the peripheral 2 to the host 7 is illustrated in FIG. 1D beginning at 50, with the peripheral 2 reading an incoming data descriptor 16 from the host memory 4 according to a current incoming data descriptor pointer 26 at 52. The peripheral 2 writes incoming data into the shared memory buffers 17 at 54 according to the incoming data descriptor 16. An individual descriptor 16 may be associated with a plurality of incoming data buffers 17, in which case the peripheral 2 need not read a separate incoming data descriptor 16 for every frame it transfers to a buffer 17. At 56, the peripheral 2 writes incoming data status entries 19 into the status ring 18 according to the current incoming data descriptor pointer 26 using full cache line writes if the computed lower limit on the available entries is greater than or equal to the computed (e.g., or constant) first value, as described above. Because a single incoming data descriptor 16 may be associated with a number of incoming data buffers 17, a plurality of status entries 19 may correspond with a single incoming data descriptor 16. At 58, the peripheral 2 writes the updated incoming data status pointer 22 to the CSB 20. The peripheral 2 then writes incoming data interrupt information 23 to the CSB 20 at 60 and interrupts the host 7 at 62.

At 64, the host 7 reads the incoming data interrupt information 23 from the CSB 20 to service the peripheral interrupt. The host 7 also reads an updated incoming data status pointer 22 from the CSB 20 at 66 and reads one or more corresponding incoming data status entries 19 from the status ring 18 at 68 according to the status pointer 22. At 70, the host 7 reads one or more incoming data frames from the buffers 17 according to the status pointer 22 and writes an updated descriptor pointer 26 to the peripheral 2 at 72 before the incoming data processing ends at 74. Where multi-level priority (e.g., QOS) support is provided, the incoming data flow may proceed generally as indicated in 52-72 above, with a host software driver determining the order of incoming data processing, where the operations of the host and the peripheral for both incoming and outgoing data transfer may occur concurrently.

Figure 1E:
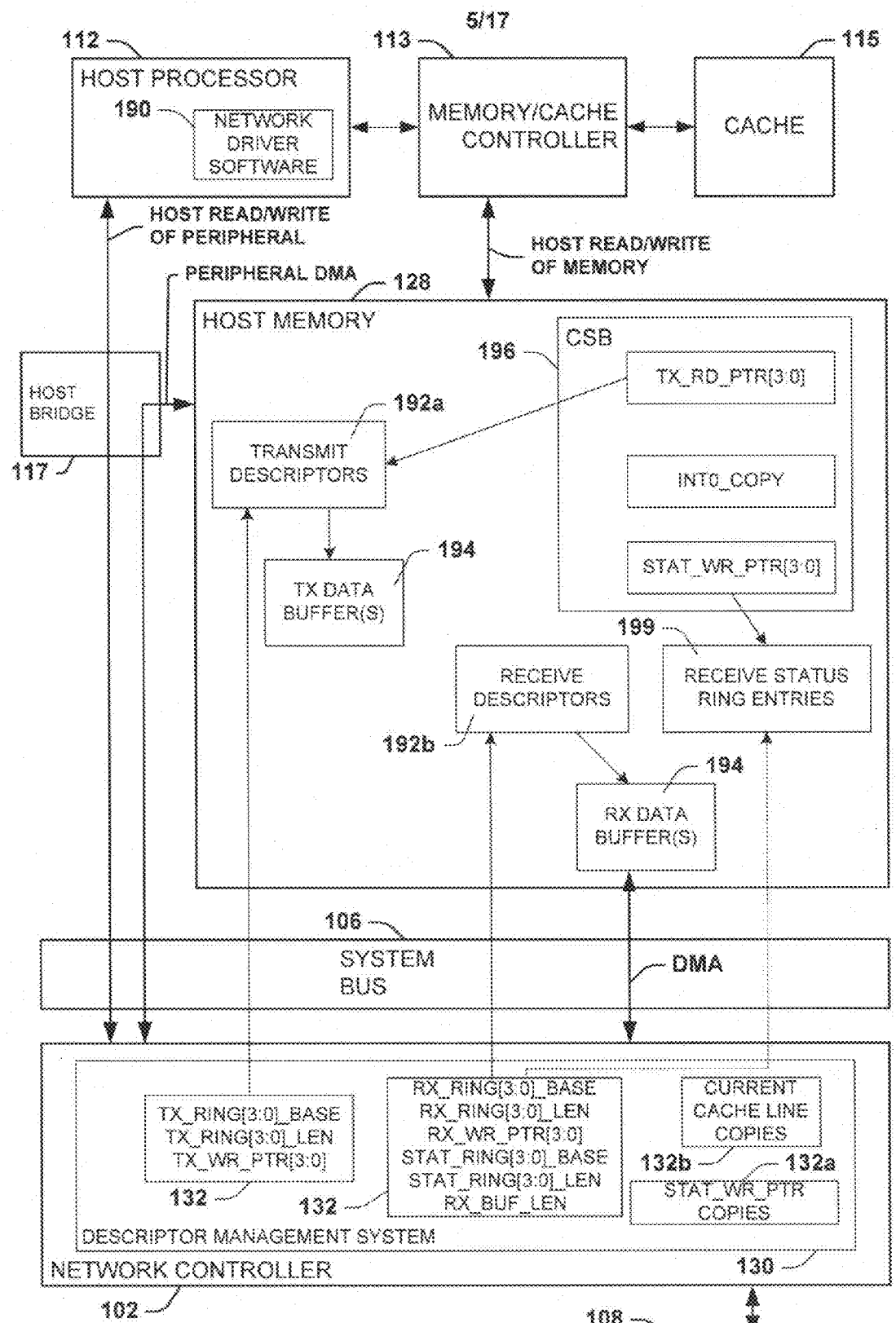
FIG. 1E is a schematic diagram illustrating an exemplary network peripheral for interfacing a host system with a network, including a descriptor management system in accordance with the invention.
Figure 1F:
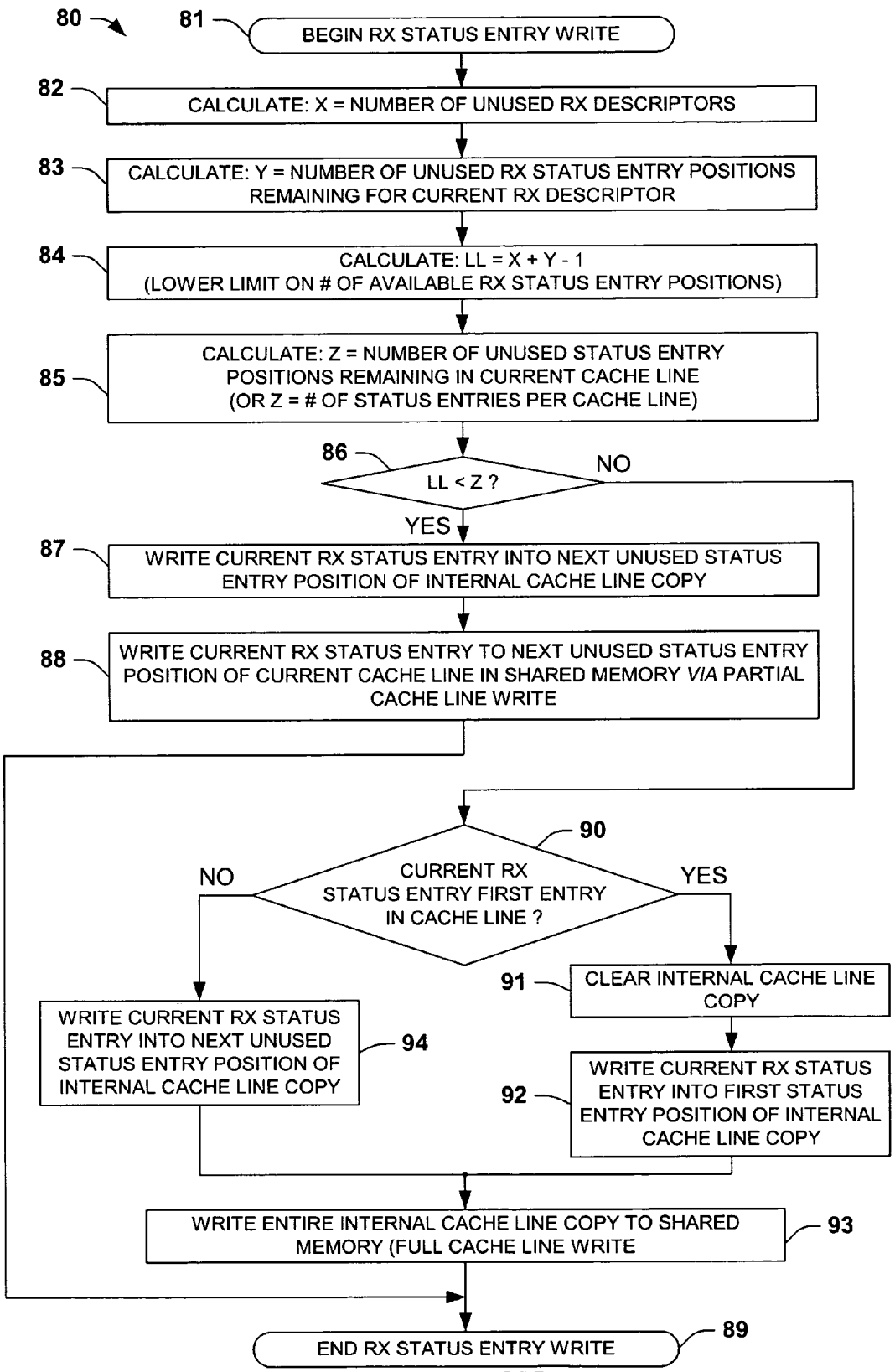
FIG. 1F is a flow diagram illustrating an exemplary method of writing incoming data status entries from the network peripheral to the host memory in accordance with the present invention.

Referring now to FIGS. 1E, 1F, and 2-7D, the invention is exemplified in a descriptor system provided in an exemplary network interface controller peripheral or network controller 102 having a descriptor management system 130. The descriptor management system 130 operates in conjunction with a network driver 190 running in a host processor 112 for transferring outgoing and incoming data (e.g., transmit and receive data) between the controller 102 and the host 112 using a shared host memory 128 as illustrated and described hereinafter. FIG. 1F provides a flow diagram illustrating an exemplary method 80 for transferring data from a peripheral to a host memory, which may be practiced in association with the exemplary network controller 102 or other peripheral devices in accordance with the present invention.

As shown in FIG. 1E, the host processor 112 may locally access the host memory 128 and a cache memory 115 via a memory/cache controller 113 and may communicate directly with the network controller 102 via I/O read and write operations across a system bus 106 using a host bridge 117, for example, where the exemplary system bus 106 is a system bus. The host memory 112 includes a control status block (CSB) 196, transmit/receive data buffers 194, as well as descriptor locations for transmit descriptors 192a, receive descriptors 192b, and receive status entries 199. The CSB includes an outgoing data (transmit) descriptor read pointer TX_RD_PTR for each of four transmit (Tx) data priority (QOS) levels, a copy of the peripheral interrupt information INTO_COPY, as well as an incoming data (receive) status pointer STAT_WR_PTR[3:0] for each of four receive (Rx) data priority levels.

The controller 102 comprises a descriptor management system or unit (DMU) 130 having various registers 132 for storage of pointers and related information by the host 112. As illustrated and describer further below, the DMU registers 132 include transmit descriptor base pointers TX_RING[3:0]_BASE for storing the memory addresses of the start of the transmit descriptor rings of the corresponding QOS priority level, and the lengths of the transmit descriptor rings are provided in TX_RING[3:0]_LEN registers. Transmit descriptor write pointers are stored in registers TX_WR_PTR [3:0], where the driver software 190 updates these registers to point just beyond the last QWORD that the driver 190 has written to the corresponding transmit descriptor ring. Receive descriptor base pointers RX_RING[3:0]_BASE include the address of the start of the receive descriptor rings of corresponding priority, and the lengths of these receive descriptor rings are provided in RX_RING[3:0]_LEN registers. Incoming data (receive) descriptor write pointers RX_WR_PTR[3:0] are updated by the driver 190 to point just beyond the last QWORD that the driver has written to the corresponding receive descriptor ring. Receive status ring base pointer registers STAT_RING[3:0]_BASE indicate the address of the receive status rings, and STAT_RING[3:0]_BASE indicate the lengths of the corresponding receive status rings. A buffer length register RX_BUF_LEN indicates the number of QWORDS of the receive data buffers 194, where all the receive data buffers 194 are of the same length, and a CSB address register CSB_ADDR indicates the address of the CSB 196 in the host memory 128.

As illustrated in FIG. 1E, the descriptor management system 130 maintains a copy 132a of the receive status pointers STAT_WR_PTR[3:0] for computing the lower limit or available status entry positions in the receive status rings, and also keeps copies 132b of the current cache lines associated with the receive status ring queues for each of four QOS priority levels. As illustrated in FIGS. 5J and 6, the exemplary cache memory 115 holds an integer number "J" cache lines CACHE LINE 1 through CACHE LINE J, where the individual cache lines are 64 bytes long in this example. The receive status ring for priority 1 is illustrated in FIG. 6 having an integer number "N" receive status entry positions RX_STAT_1 through RX_STAT_N, each having a length of 8 bytes corresponding to the length of the exemplary receive status entries 199 (FIG. 5J). Thus, the receive status entries 199 and the entry positions therefor in the status ring are much smaller than the cache line size. For this example, therefore, each cache line can hold 8 receive status entries 199.

In this situation, if the controller 102 writes a single status entry 199 (or fewer than 8 entries 199) to the receive status ring in host memory 128, the memory/cache controller 113 performs a partial cache line write operation. As discussed above, this causes the memory/cache controller 113 to read the entire cache line from the memory 128, merge in the new entry 199, and write the updated cache line back into the system memory 128. To reduce the amount of such partial cache line writes for transferring receive status entries 199 to the host memory 128, the descriptor management system 130 of the exemplary network controller is configured to perform selective full cache line writes in accordance with the present invention.

FIG. 1F illustrates an exemplary method 80 for transferring data entries from a peripheral to a data queue in a host system memory, which may be employed in association with any type of peripheral, including but not limited to the exemplary network controller peripherals 2 and 102 illustrated and described herein. Although the exemplary method 80 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. As implemented in the exemplary descriptor management system 130, the method 80 provides for determining a lower limit on a number of available receive status entry positions in the receive status ring queue of the host memory 128, and selectively transferring one or more current status entries 199 to a status ring queue in the memory 128 using a full cache line write if the lower limit is greater than or equal to a first value.

Beginning at 81, the method 80 comprises calculating the number of unused receive descriptors 192b (FIG. 1E) available to the network controller 102 at 82 (variable "X" in the flow diagram of FIG. 1F). As discussed above and illustrated below in FIG. 5H, the receive descriptor write pointers RX_WR_PTR[3:0] stored in the registers 132 for the descriptor management system 130 are updated by the driver 190 to point just beyond the last location that the driver 190 has written to the corresponding receive descriptor ring. Thus, for a given priority level, the descriptor management system 130 can determine the last available receive descriptor 192b. In addition, the descriptor management system 130 maintains a copy 132a of the receive status write pointers STAT_WR_PTR[3:0] written to the CSB 196, which point just beyond the last location that the controller 102 has written to the corresponding priority receive status ring queue, thus indicating the next available status entry location. At 82, the descriptor management system 130 subtracts the value of the receive descriptor write pointer RX_WR_PTR from that of the receive status write pointer STAT_WR_PTR for a particular priority level. The system 130 may use the resulting value "X" as the lower limit for comparison with the first value below at 86, or may optionally refine the lower limit estimate at 83 and 84 below.

At 83 and 84, the descriptor management system 130 calculates the number of unused receive status entry positions remaining for a current receive descriptor (variable "Y"), and computes the lower limit ("LL" in FIG. 1F) as the sum of X+Y−1. In the exemplary descriptor system, a single receive descriptor 192b may be associated with a plurality of receive data buffers 194 and corresponding receive status entries 199, as illustrated and described further below with respect to FIG. 5G. In particular, the exemplary receive descriptors 192b include a BUF_MULT[7:0] field which indicates the number of receive buffers 194 (and the corresponding number of receive status entries 199) associated with the descriptor 192b, wherein different receive descriptors 192b can be associated with different numbers of buffers 194. In the case where some but not all of the buffers 194 and corresponding status entries 199 have been used for a particular receive descriptor 192b, the descriptor management system 130 can thus use the number of unused status entries 199 in estimating the lower limit at 84.

At 85, a first value (e.g., variable "Z" in the flow diagram of FIG. 1F) is determined as the number of unused receive status entries 199 remaining in the current cache line. Alternatively, the first value "Z" may be a constant value representing the number of status entries 199 per cache line (8 in this example). Referring also to FIGS. 7A-7D, several examples are illustrated for an exemplary cache line copy 132b in the descriptor management system 130, wherein the contents of the cache line copy 132b are the same as the corresponding cache line in the host memory 128. It is noted that the receive status rings may be individually associated with several cache lines depending upon the status ring lengths.

Figures 7A, 7B:
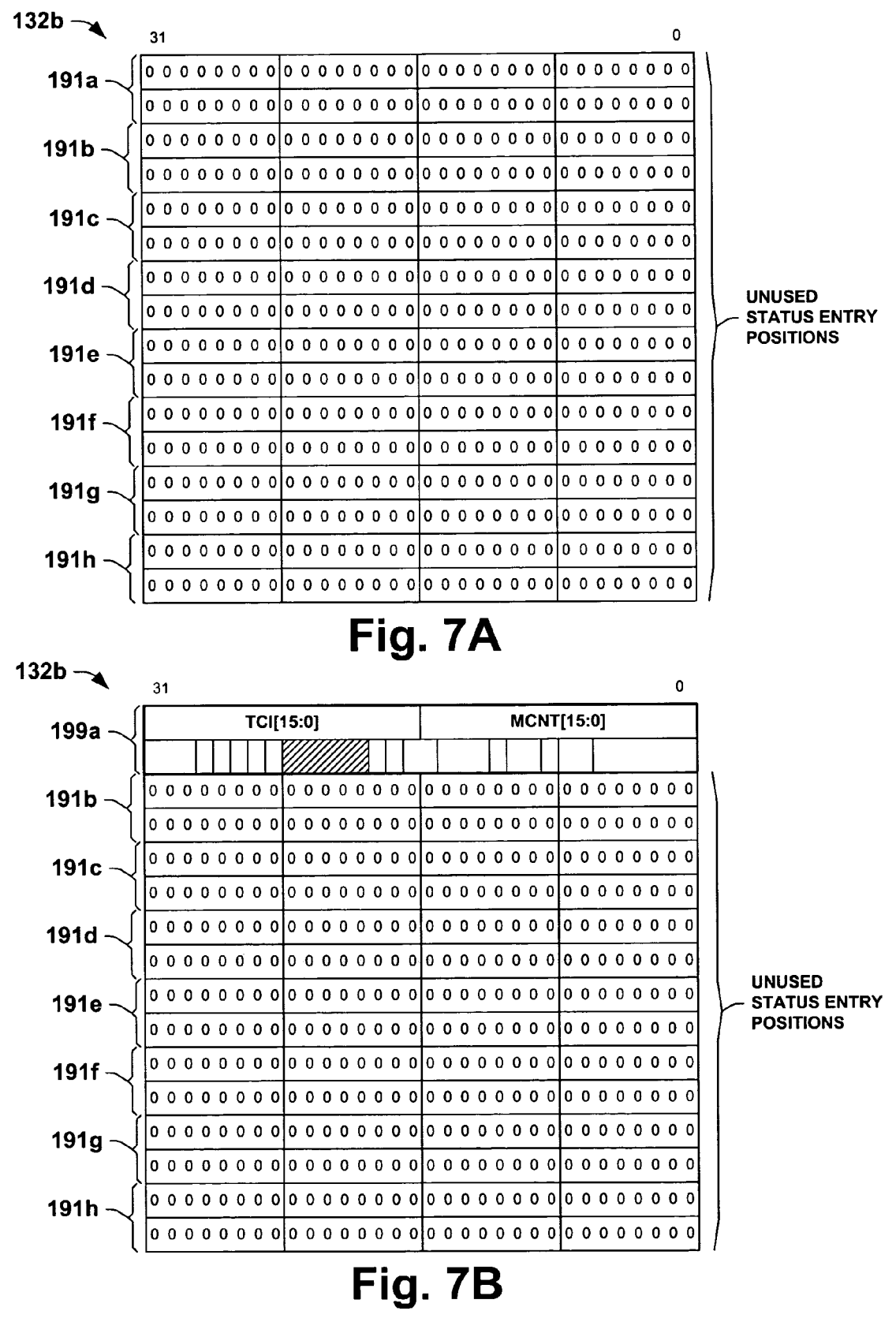
Figure 7C:
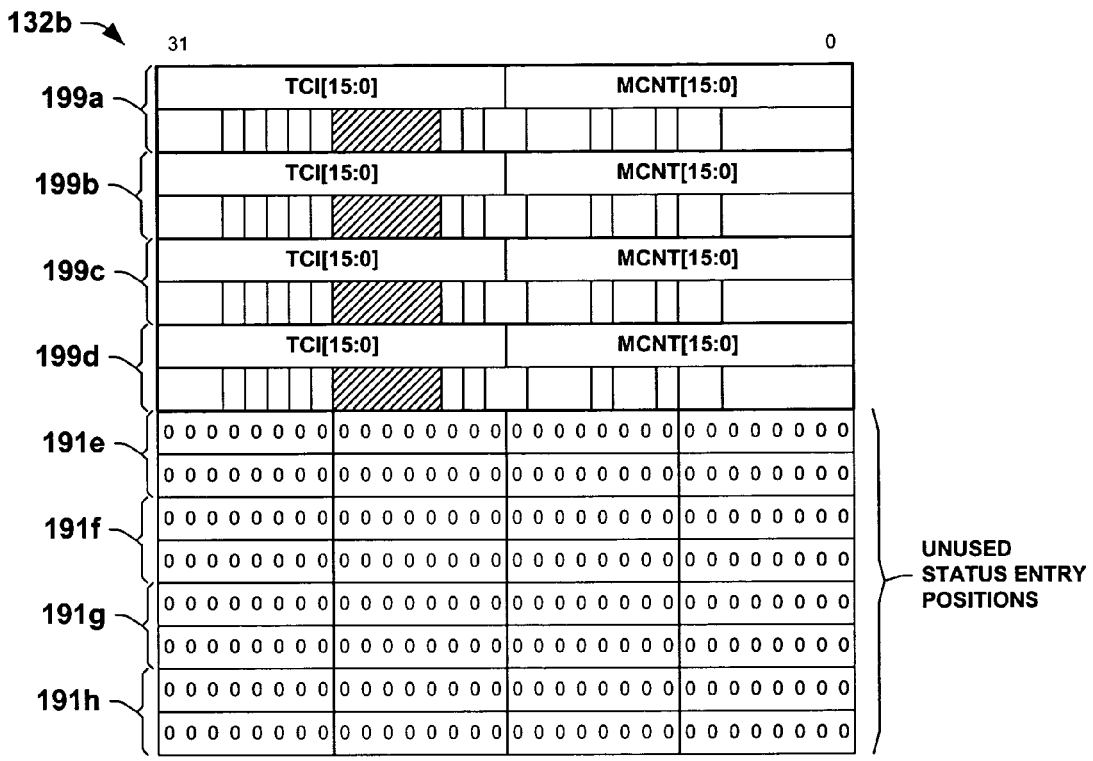
Figure 7D:
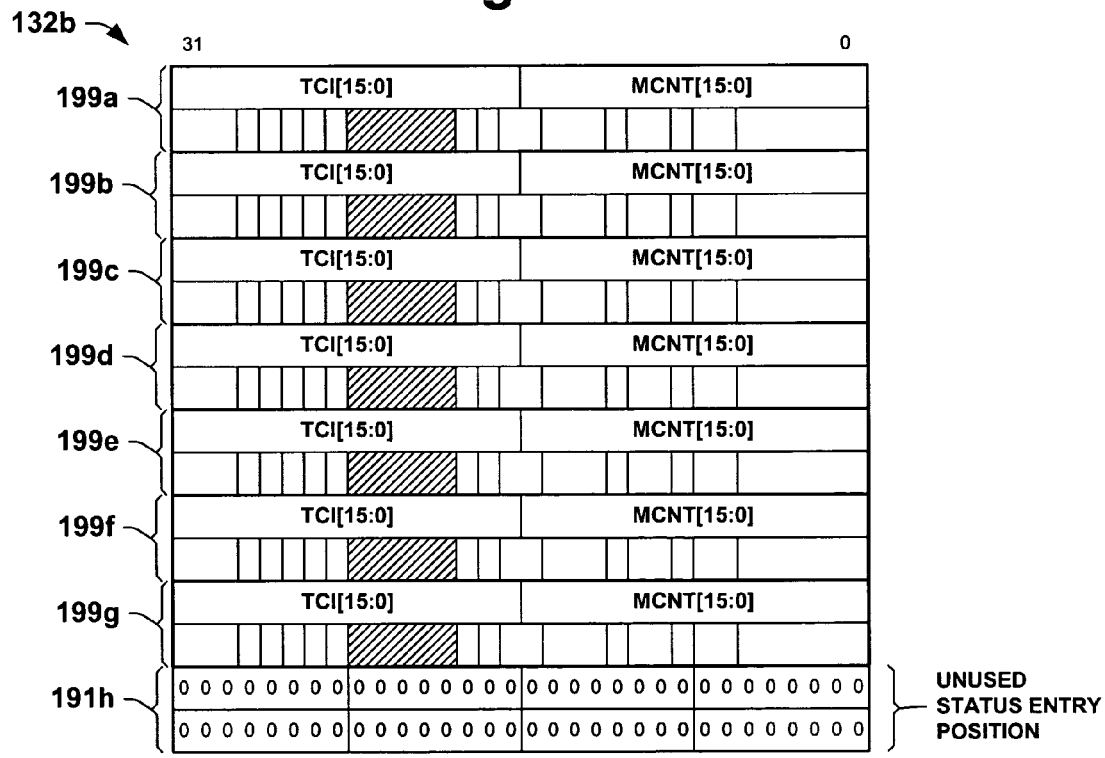

In FIG. 7A, no status entries 199 have yet been written to the current cache line 132b, which has 8 unused status entry positions 191a-191h available, wherein the entry positions 191 in a given cache line may all correspond to a single receive descriptor 192b or different entries 191 may correspond to different descriptors 192b, depending upon the contents of the BUF_MULT[7:0] fields in the various descriptors 192b in the receive descriptor ring in host memory 128. In FIG. 7B, a status entry 199a has been written to the memory 128 and to the current cache line copy 132b, leaving 7 unused status entry positions 191b-191h available. In FIG. 7C, entries 199b-199d are added, leaving 4 unused entry positions 191e-191h. Thereafter in FIG. 7D, three other receive status entries 199e-199g have been written to the cache line of the host memory 128 and to the copy 132b, leaving a single unused entry position 191h.

It is noted that in the exemplary network controller 102, the descriptor management system 130 only ascertains the contents of the descriptor BUF_MULT[7:0] field upon reading the descriptors 192b from the host memory 128. As a result, the system 130 does not know how many unused status entries 191 are associated with descriptors 192b beyond the descriptor currently being used. However, the system 130 assumes that each receive descriptor 192b has at least one buffer 194 and therefore at least one status entry position 191 associated therewith, and determines the lower limit "LL" at 84 accordingly. This ensures that full cache line writes are used for writing the status entries 199 when there is no chance for corrupting status data that the host 112 has not yet processed in the current cache line.

Having determined the lower limit "LL" on the number of available receive status entry positions 191 available in the current cache line at 84 and the first value "Z" at 85, the descriptor management system 130 makes a determination at 86 as to whether the lower limit is less than the first value. If so (YES at 86), a full cache line write to the status ring in the host memory 128 may corrupt unprocessed status entries 199, and the descriptor management system 130 writes the current receive status entry 199 into the next unused position in the internal cache copy 132b at 87. In addition, the current entry 199 is written to the corresponding location in the memory 128 via a partial cache line write at 88, before the status entry write operation ends at 89. However, if the lower limit "LL" is greater than or equal to the first value "Z" (NO at 86), the descriptor management system 130 determines at 90 whether the current entry 199 is to go in the first entry position 191 in the cache line. If so (YES at 90), the internal current cache line copy 132b is optionally cleared at 91 to all zeros, and the entry 199 is written to the first entry position 191 thereof (e.g., entry 191a in FIG. 7A) at 92. The entire current cache line copy 132b (e.g., including the first entry 199a and zeros in the positions 191b-191h as shown in FIG. 7B) is then written at 93 to the host memory 128 as a full cache line write.

Where the current receive status entry 199 is not destined for the first position 191 in the cache line copy 132b (NO at 90), the descriptor management system 130 writes the current receive status entry 199 to the next unused position 191 at 94 before writing the entire cache line copy 132b to the memory 128 using a full cache line write at 93, and the status entry write operation ends at 89. For example, if the current cache line copy 132 is in the state illustrated in FIG. 7C, the current status entry 199 would be written to the entry position 191e at 94, and the resulting internal current cache line copy 132b would then be written to the status ring queue in the host memory 128 using a full cache line write at 93.

It is noted that the computation of the lower limit "LL" and the first value "Z" in the method 80 ensures that no unprocessed status entries remain in the current cache line of the host memory 128 (e.g., an/or in the cache line of the cache memory 115) when a full cache line write is used at 93. Thus, the internal current cache line copy 132b in the descriptor management system 130 may but need not be cleared at 91, or may be set to any value, wherein this step is not a requirement for implementing the present invention. In addition, it is noted that if the descriptor management system 130 knew in advance that remaining entries 191 in the current cache line copy were associated with one or more descriptors 192b known to be available to the controller 102, a full cache line write could be employed within the scope of the invention even where the sum X+Y was less than or equal to the number of unused entry positions 191 in the current cache line, for example, by discounting the first value "Z" accordingly.

However, in the exemplary implementation in the controller 102, the descriptor management system 130 in the controller 102 would have to read additional descriptors 192b to discover such information (e.g., by reading the BUF_MULT [7:0] fields thereof), thus wasting system resources for the extra memory read by the peripheral controller 102. In the illustrated implementation, therefore, the controller 102 uses information already available in the registers 132 of the descriptor management system 130 to determine or estimate a safe lower limit "LL" for deciding when to use full or partial cache writes. In this regard, it is noted that during normal operation, the receive status ring will typically be empty or close to empty, and therefore that a significant number of receive status write operations will employ full cache line writes, thereby achieving improved system operation compared with the alternative of using partial cache line writes for each receive status entry 199.

Figure 2:
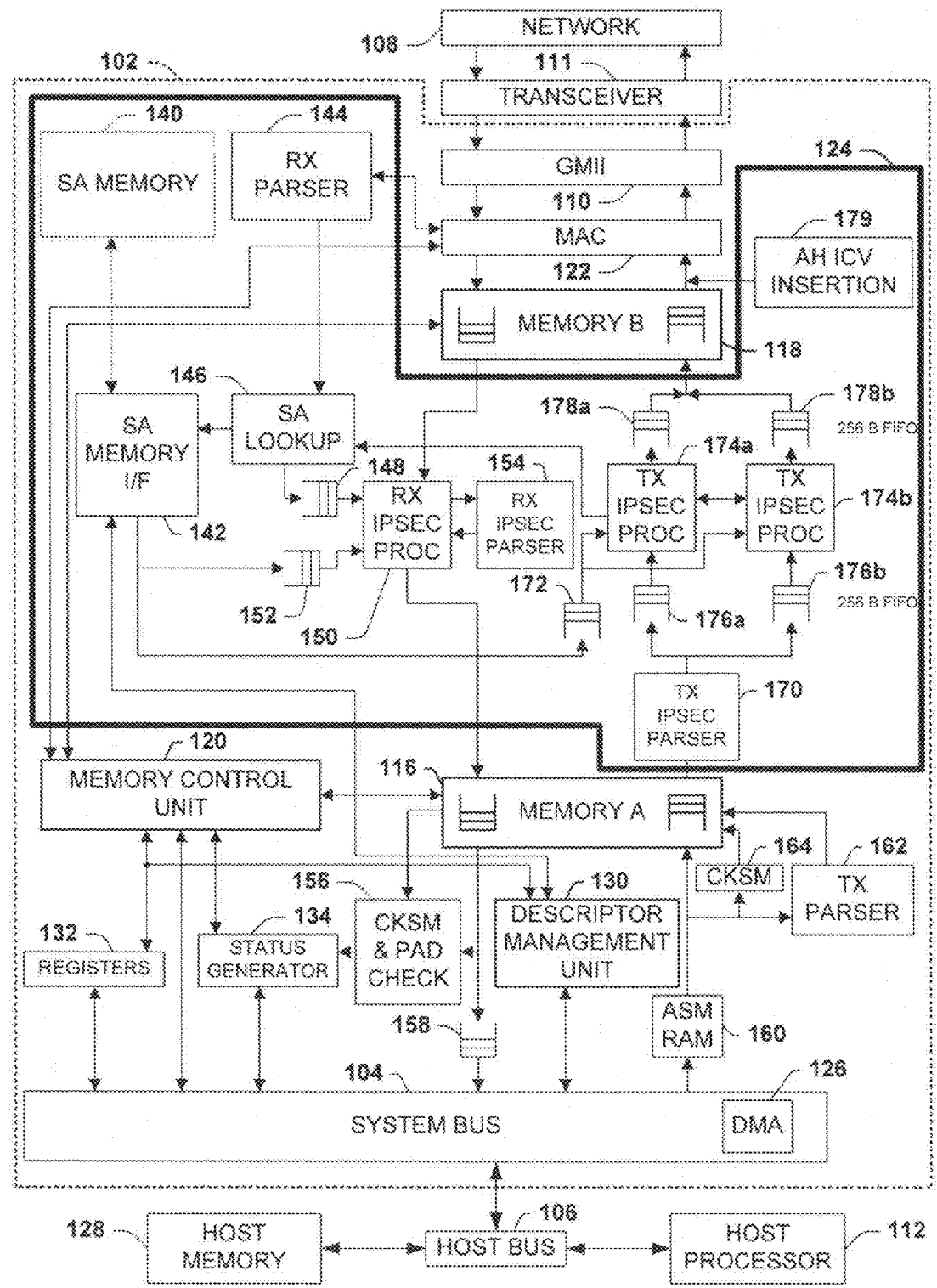
FIG. 2 is a schematic diagram further illustrating the exemplary network peripheral system in which various aspects of the invention may be carried out.
Figure 3:
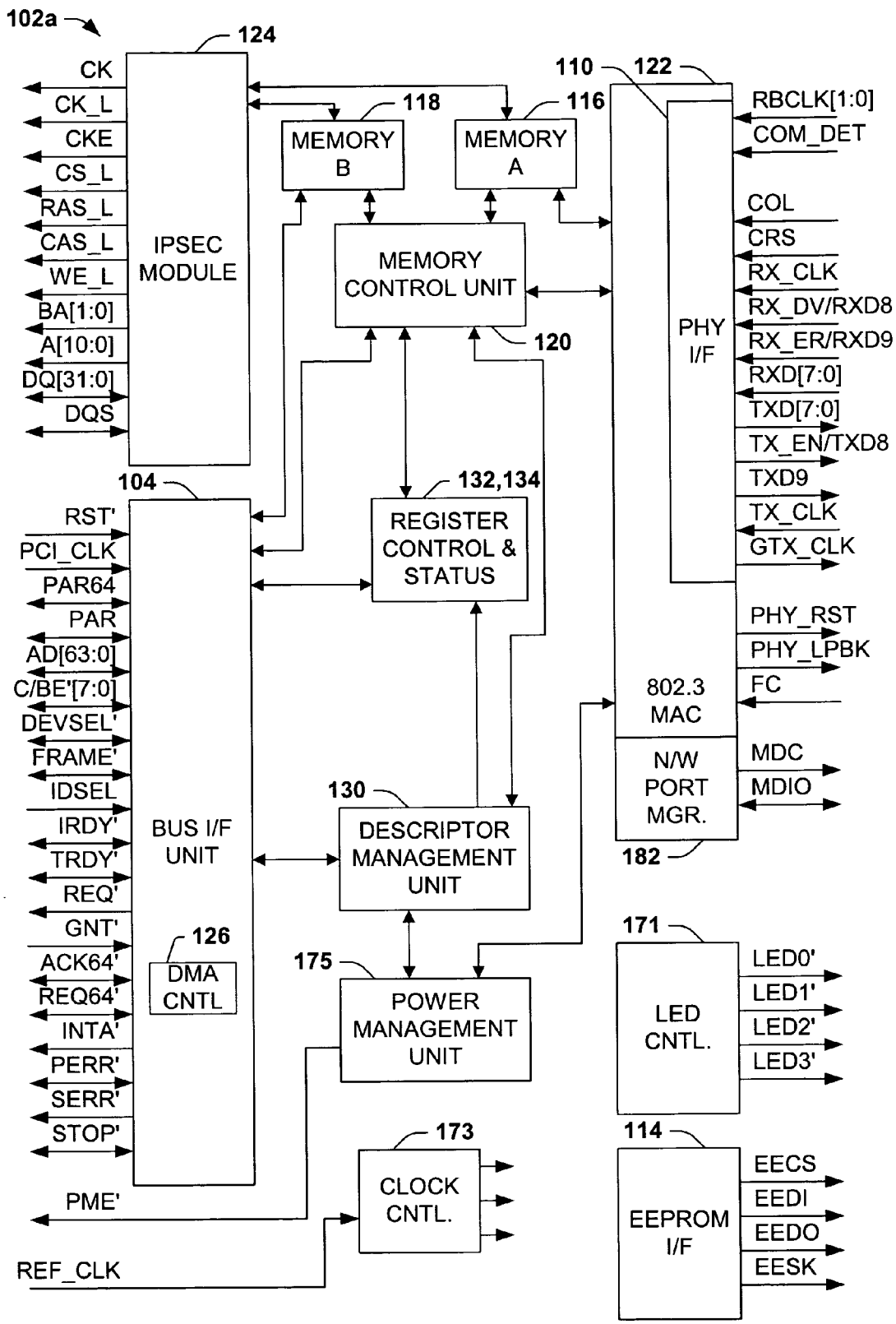
FIG. 3 is a schematic diagram illustrating an exemplary single-chip network controller implementation of the network system of FIG. 2.
Figure 4:
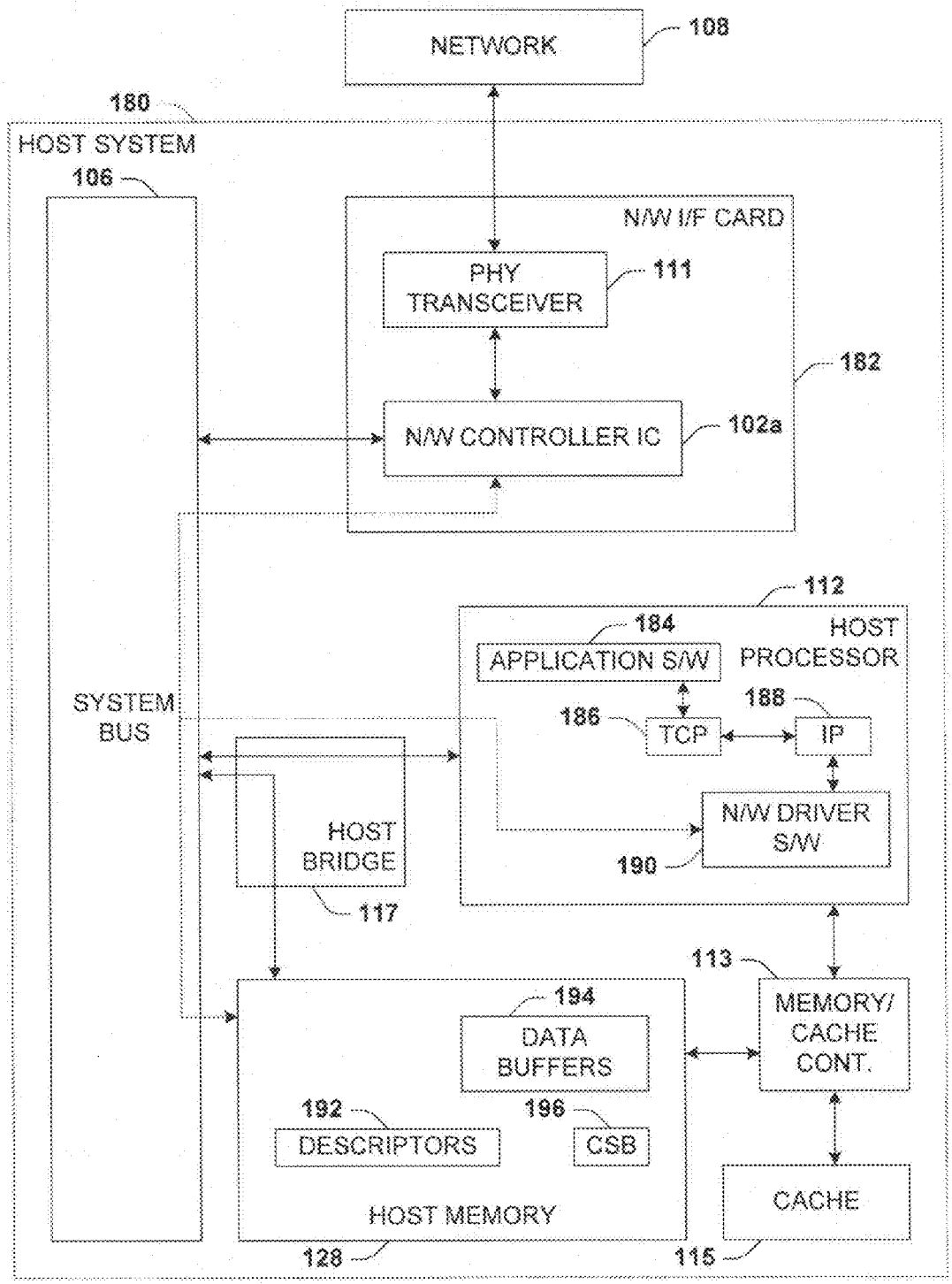
FIG. 4 is a schematic diagram illustrating a host system interfacing with a network using the exemplary network controller of FIG. 3.

FIG. 2 illustrates further details of the exemplary network controller 102 and FIGS. 3 and 4 illustrate an exemplary single-chip implementation 102a of the network controller 102. The exemplary single-chip network controller 102a includes all the functionality and components described herein with respect to the network interface system 102. The various blocks, systems, modules, engines, etc. described herein may be implemented using any appropriate analog and/or digital circuitry, wherein one or more of the blocks, etc. described herein may be combined with other circuitry in accordance with the invention. The network controller 102 includes a 64-bit system bus interface 104 for connection with a host PCI or system bus 106 that operates at a clock speed up to 133 MHz in PCI-X mode or up to 66 MHz in standard PCI mode. The network controller 102 may be operated as a bus master or a slave. Much of the initialization can be done automatically by the network controller 102 when it reads an optional EEPROM (not shown), for example, via an EEPROM interface 114 (FIG. 3). The network controller 102 can be connected to an IEEE 802.3 or proprietary network 108 through an IEEE 802.3-compliant Media Independent Interface (MII) or Gigabit Media Independent Interface (GMII) 110, for interfacing the controller 102 with the network 108 via an external transceiver device 111. For 1000 Mb/s operation the controller 102 supports either the byte-wide IEEE 802.3 Gigabit Media Independent Interface (GMII) for 1000BASE-T PHY devices 111 or the IEEE 802.3 Ten-Bit Interface (TBI) for 1000BASE-X devices 111. The network controller 102 supports both half-duplex and full-duplex operation at 10 and 100 Mb/s rates and full-duplex operation at 1000 Mb/s.

A host device, such as a host processor 112 on the host system bus 106 in a host system 180, may interface with the network controller 102 via the system bus 106 and the host bridge 117. The host processor 112 includes one or more processors that can operate in a coordinated fashion. Referring also to FIG. 4, the single-chip network controller 102a may be provided on a network interface card or circuit board 182, together with a PHY transceiver 111 for interfacing the host processor 112 with the network 108 via the host bridge 117, the host bus 106, and the transceiver 111. The system bus interface 104 includes PCI configuration registers used to identify the network controller 102a to other devices on the PCI bus and to configure the device. Once initialization is complete, the host processor 112 has direct access to the I/O registers of the network controller 102 for performance tuning, selecting options, collecting statistics, and starting transmissions through the host bridge 117 and the bus 106. The host processor 112 is operatively coupled with the host memory 128 and a cache memory 115 via a memory/cache controller 113. One or more application software programs 184 executing in the host processor 112 may be provided with network service via layer 4 (e.g., transport layer) software, such as transmission control protocol (TCP) layer software 186, layer 3 (e.g., network layer) software 188, such as internet protocol (IP) software 188, and a software network driver 190, also running on the host processor 112. As discussed below, the network driver software 190 interacts with the host memory 128 and the network controller 102 to facilitate data transfer between the application software 184 and the network 108.

As illustrated in FIG. 2, the exemplary network controller 102 comprises first and second internal random access memories MEMORY A 116 and MEMORY B 118, organized as first-in first-out (FIFO) memories for storage of frames. A memory control unit 120 is provided for control and operation of the memories 116 and 118. The network controller 102 also comprises a media access control (MAC) engine 122 satisfying requirements for operation as an Ethernet/IEEE 802.3-compliant node and providing the interface between the memory 118 and the GMII 110. The MAC engine 122 may be operated in full or half-duplex modes. An Internet Protocol Security (Ipsec) engine 124 coupled with the memories 116 and 118 provides authentication and/or encryption functions.

The system bus interface 104 includes a Direct Memory Access (DMA) controller 126 that automatically transfers network frame data between the network controller 102 and buffers in host memory 128 via the host bus 106. The operation of the DMA controller 126 is directed by a descriptor management system 130 according to data structures called descriptors 192, which include pointers to one or more data buffers 194 in system memory 128, as well as control information. The descriptors 192 are stored in the host memory 128 in queues called descriptor rings. Four transmit descriptor rings are provided for transmitting frames and four receive descriptor rings for receiving frames, corresponding to four priorities of network traffic in the illustrated controller 102. Additionally, four receive status rings are provided, one for each priority level, that facilitates synchronization between the network controller 102 and the host system. Transmit descriptors 192 control the transfer of frame data from the host memory 128 to the controller 102, and receive descriptors 192 control the transfer of frame data in the other direction. In the exemplary controller 102, each transmit descriptor 192 corresponds to one network frame, whereas each receive descriptor 192 corresponds to one or more host memory buffers in which frames received from the network 108 can be stored.

The software interface allocates contiguous memory blocks for descriptors 192, receiver status, and data buffers 194. These memory blocks are shared between the software (e.g., the network driver 190) and the network controller 102 during normal network operations. The descriptor space includes pointers to network frame data in the buffers 194, the receiver status space includes information passed from the controller 102 to the software in the host 112, and the data buffer areas 194 for storing frame data that is to be transmitted (e.g., outgoing data) and for frame data that has been received (e.g., incoming data).

Synchronization between the controller 102 and the host processor 112 is maintained by pointers stored in hardware registers 132 in the controller 102, pointers stored in a controller status block (CSB) 196 in the host memory 128, and interrupts. The CSB 196 is a block of host memory 128 that includes pointers into the descriptor and status rings and a copy of the contents of the controller's interrupt register. The CSB 196 is written by the network controller 102 and read by the host processor 112. Each time the software driver 190 in the host 112 writes a descriptor or set of descriptors 192 into a descriptor ring, it also writes to a descriptor write pointer register in the controller 102. Writing to this register causes the controller 102 to start the transmission process if a transmission is not already in progress. Once the controller has finished processing a transmit descriptor 192, it writes this information to the CSB 196. After receiving network frames and storing them in receive buffers 194 of the host memory 128, the controller 102 writes to the receive status ring and to a write pointer, which the driver software 190 uses to determine which receive buffers 194 have been filled. Errors in received frames are reported to the host memory 128 via a status generator 134.

The IPsec module or engine 124 provides standard authentication, encryption, and decryption functions for transmitted and received frames. For authentication, the IPsec module 124 implements the HMAC-MD5-96 algorithm defined in RFC 2403 (a specification set by the Internet Engineering Task Force) and the HMAC-SHA-1-96 algorithm defined in RFC 2404. For encryption, the module implements the ESP DES-CBC (RFC 2406), the 3DES-CBC, and the AES-CBC encryption algorithms. For transmitted frames, the controller 102 applies IPsec authentication and/or encryption as specified by Security Associations (SAs) stored in a private local SA memory 140, which are accessed by IPsec system 124 via an SA memory interface 142. SAs are negotiated and set by the host processor 112. SAs include IPsec keys, which are required by the various authentication, encryption, and decryption algorithms, IPsec key exchange processes are performed by the host processor 112. The host 112 negotiates SAs with remote stations and writes SA data to the SA memory 140. The host 112 also maintains an IPsec Security Policy Database (SPD) in the host memory 128.

A receive (RX) parser 144 associated with the MAC engine 122 examines the headers of received frames to determine what processing needs to be done. If it finds an IPsec header, it uses information contained in the header, including a Security Parameters Index (SPI), an IPsec protocol type, and an IP destination address to search the SA memory 140 using SA lookup logic 146 and retrieves the applicable security association. The result is written to an SA pointer FIFO memory 148, which is coupled to the lookup logic 146 through the SA memory interface 142. The key corresponding to the SA is fetched and stored in RX key FIFO 152. A receive (RX) IPsec processor 150 performs the processing requires by the applicable SA using the key. The controller 102 reports what security processing it has done, so that the host 112 can check the SPD to verify that the frame conforms with policy. The processed frame is stored in the memory 116.

A receive IPsec parser 154, associated with IPsec processor 150, performs parsing that cannot be carried out before packet decryption. Some of this information is used by a receive (Rx) checksum and pad check system 156, which computes checksums specified by headers that may have been encrypted and also checks pad bits that may have been encrypted to verify that they follow a pre-specified sequence for pad bits. These operations are carried out while the received frame is passed to the system bus 104 via FIFO 158. The checksum and pad check results are reported to the status generator 134.

In the transmit path, an assembly RAM 160 is provided to accept frame data from the system memory 128, and to pass the data to the memory 116. The contents of a transmit frame can be spread among multiple data buffers 194 in the host memory 128, wherein retrieving a frame may involve multiple requests to the system memory 128 by the descriptor management system 130. These requests are not always satisfied in the same order in which they are issued. The assembly RAM 160 ensures that received chunks of data are provided to appropriate locations in the memory 116. For transmitted frames, the host 112 checks the SPD (IPsec Security Policy Database) to determine what security processing is needed, and passes this information to the controller 102 in the frame's descriptor 192 in the form of a pointer to the appropriate SA in the SA memory 140. The frame data in the host memory 128 provides space in the IPsec headers and trailers for authentication data, which the controller 102 generates. Likewise, space for padding (to make the payload an integral number of blocks) is provided when the frame is stored in the host memory buffers 194, but the pad bits are written by the controller 102.

As the data is sent out from the assembly RAM 160, it passes also into a first transmit (TX) parser 162, which reads the MAC header, the IP header (if present), the TCP or UDP header, and determines what kind of a frame it is, and looks at control bits in the associated descriptor. In addition, the data from the assembly RAM 160 is provided to a transmit checksum system 164 for computing IP header and/or TCP checksums, which values will then be inserted at the appropriate locations in the memory 116. The descriptor management system 130 sends a request to the SA memory interface 142 to fetch an SA key, which is then provided to a key FIFO 172 that feeds a pair of TX IPsec processors 174a and 174b. Frames are selectively provided to one of a pair of TX IPsec processors 174a and 174b for encryption and authentication via TX IPsec FIFOs 176a and 176b, respectively, wherein a transmit IPsec parser 170 selectively provides frame data from the memory 116 to a selected one of the processors 174. The two transmit IPsec processors 174 are provided in parallel because authentication processing cannot begin until after encryption processing is underway. By using the two processors 174, the speed is comparable to the receive side where these two processes can be carried out simultaneously.

Authentication does not cover mutable fields, such as occur in IP headers. The transmit IPsec parser 170 accordingly looks for mutable fields in the frame data, and identifies these fields to the processors 174a and 174b. The output of the processors 174a and 174b is provided to the second memory 118 via FIFOs 178a and 178b, respectively. An Integrity Check Value (ICV), which results from authentication processing, is inserted into the appropriate IPsec header by an insertion unit 179 as the frame data is passed from the memory 118 to the MAC engine 122 for transmission to the network 108.

In the single-chip implementation of FIG. 3, the controller 102a comprises a network port manager 182, which may automatically negotiate with an external physical (PHY) transceiver via management data clock (MDC) and management data I/O (MDIO) signals. The network port manager 182 may also set up the MAC engine 122 to be consistent with the negotiated configuration. Circuit board interfacing for LED indicators is provided by an LED controller 171, which generates LED driver signals LED0'-LED3' for indicating various network status information, such as active link connections, receive or transmit activity on the network, network bit rate, and network collisions. Clock control logic 173 receives a free-running 125 MHz input clock signal as a timing reference and provides various clock signals for the internal logic of the controller 102a.

A power management unit 175, coupled with the descriptor management system 130 and the MAC engine 122, can be used to conserve power when the device is inactive. When an event requiring a change in power level is detected, such as a change in a link through the MAC engine 122, the power management system 175 provides a signal PME' indicating that a power management event has occurred. The external serial EEPROM interface 114 implements a standard EEPROM interface, for example, the 93Cxx EEPROM interface protocol. The leads of external serial EEPROM interface 114 include an EEPROM chip select (EECS) pin, EEPROM data in and data out (EEDI and EEDO, respectively) pins, and an EEPROM serial clock (EESK) pin.

In the bus interface unit 104, address and data are multiplexed on bus interface pins AD[63:0]. A reset input RST' may be asserted to cause the network controller 102a to perform an internal system reset. A cycle frame I/O signal FRAME' is driven by the network controller when it is the bus master to indicate the beginning and duration of a transaction, and a PCI clock input PCI_CLK is used to drive the system bus interface over a frequency range of 15 to 133 MHz on the PCI bus (e.g., host bus 106). The network controller 102a also supports Dual Address Cycles (DAC) for systems with 64-bit addressing, wherein low order address bits appear on the AD[31:0] bus during a first clock cycle, and high order bits appear on AD[63:32] during the second clock cycle. A REQ64' signal is asserted by a device acting as bus master when it wants to initiate a 64-bit data transfer, and the target of the transfer asserts a 64-bit transfer acknowledge signal ACK64' to indicate that it is willing to transfer data using 64 bits. A parity signal PAR64 is an even 8 byte parity signal that protects AD[63:32] The bus master drives PAR64 for address and write data phases and the target drives PAR64 for read data phases.

The network controller 102a asserts a bus request signal REQ' to indicate that it wishes to become a bus master, and a bus grant input signal GNT' indicates that the access to the bus has been granted to the network controller. An initialization device select input signal IDSEL is used as a chip select for the network controller during configuration read and write transactions. Bus command and byte enable signals C/BE[7:0] are used to transfer bus commands and to indicate which physical bytes of data lines AD[63:0] carry meaningful data. A parity I/O signal PAR indicates and verifies even parity across AD[31:0] and C/BE[3:0].

The network controller drives a drive select I/O signal DEVSEL' when it detects a transaction that selects the network controller 102a as a target. The network controller 102a checks DEVSEL' to see if a target has claimed a transaction that the network controller initiated. TRDY' is used to indicate the ability of the target of the transaction to complete the current data phase, and IRDY' indicates the ability of the initiator of the transaction to complete the current data phase. Interrupt request output signal INTA' indicates that one or more enabled interrupt flag bits are set. The network controller 102a asserts a parity error I/O signal PERR' when it detects a data parity error, and asserts a system error output signal SERR' when it detects an address parity error. In addition, the controller 102a asserts a stop I/O signal STOP' to inform the bus master to stop the current transaction.

In the MAC engine 122, a physical interface reset signal PHY_RST is used to reset the external PHY 111 (MII, GMII, TBI), a PHY loop-back output PHY_LPBK is used to force an external PHY device 111 into loop-back mode for systems testing, and a flow control input signal FC controls when the MAC transmits a flow control frame. The network controller 102a provides an external PHY interface 110 that is compatible with either the Media Independent Interface (MII), Gigabit Media Independent Interface (GMII), or Ten Bit Interface (TBI) per IEEE Std 802.3. Receive data input signals RXD [7:0] and output signals TXD[7:0] are used for receive and transmit data exchange, respectively. When the network controller 102a is operating in GMII or MII mode, TX_EN/TXD [8] is used as a transmit enable. In TBI mode, this signal is bit 8 of the transmit data bus. RX_DV/RXD[8] is an input used to indicate that valid receive data is being presented on the RX pins. In TBI mode, this signal is bit 8 of the receive data bus.

When the network controller 102a is operating in GMII or MII mode, RX_ER/RXD[9] is an input that indicates that the external transceiver device has detected a coding error in the receive frame currently being transferred on the RXD pins. In TBI mode, this signal is bit 9 of the receive data bus. MII transmit clock input TX_CLK is a continuous clock input that provides the timing reference for the transfer of the TX_EN and TXD[3:0] signals out of the network controller 102a in MII mode. GTX_CLK is a continuous 125 MHz clock output that provides the timing reference for the TX_EN and TXD signals from the network controller when the device is operating in GMII or TBI mode. RX_CLK is a clock input that provides the timing reference for the transfer of signals into the network controller when the device is operating in MII or GMII mode. COL is an input that indicates that a collision has been detected on the network medium, and a carrier sense input signal CRS indicates that a non-idle medium, due either to transmit or receive activity, has been detected (CRS is ignored when the device is operating in full-duplex mode). In TBI mode, 10-bit code groups represent 8-bit data packets. Some 10-bit code groups are used to represent commands. The occurrence of even and odd code groups and special sequences called commas are all used to acquire and maintain synchronization with the PHY 110. RBCLK[0] is a 62.5 MHz clock input that is used to latch odd-numbered code groups from the PHY device, and RBCLK[1] is used to latch even-numbered code groups. RBCLK[1] is always 180 degrees out of phase with respect to RBCLK[0]. COM_DET is asserted by an external PHY 111 to indicate the code group on the RXD[9:0] inputs includes a valid comma.

The IPsec module 124 includes an external RAM interface to memories 116 and 118. When CKE is driven high, an internal RAM clock is used to provide synchronization, otherwise the differential clock inputs CK and CK_L are used. The RAM's have a command decoder, which is enabled when a chip select output CS_L is driven low. The pattern on the WE_L, RAS_L, and CAS_L pins defines the command that is being issued to the RAM. Bank address output signals BA[1:0] are used to select the memory to which a command is applied, and an address supplied by RAM address output pins A[10:0] selects the RAM word that is to be accessed. A RAM data strobe I/O signal DQS provides the timing that indicates when data can be read or written, and data on RAM data I/O pins DQ[31:0] are written to or read from either memory 116 or 118.

Returning again to FIG. 2, an operational discussion of receive and transmit operation of the network controller 102 is provided below. Starting with receipt of a data frame from the network media 108 (e.g., an optical fiber), the frame is delivered to the GMII 110 (the Gigabit Media-Independent Interface), for example, as a series of bytes or words in parallel. The GMII 110 passes the frame to the MAC 122 according to an interface protocol, and the MAC 122 provides some frame management functions. For example, the MAC 122 identifies gaps between frames, handles half duplex problems, collisions and retries, and performs other standard Ethernet functions such as address matching and some checksum calculations. The MAC 122 also filters out frames, checks their destination address and accepts or rejects the frame depending on a set of established rules.

The MAC 122 can accept and parse several header formats, including for example, IPv4 and IPv6 headers. The MAC 122 extracts certain information from the frame headers. Based on the extracted information, the MAC 122 determines which of several priority queues (not shown) to put the frame in. The MAC places some information, such as the frame length and priority information, in control words at the front of the frame and other information, such as whether checksums passed, in status words at the back of the frame. The frame passes through the MAC 122 and is stored in the memory 118 (e.g., a 32 KB RAM). In this example, the entire frame is stored in memory 118. The frame is subsequently downloaded to the system memory 128 to a location determined by the descriptor management system 130 according to the descriptors 192 in the host memory 128 (FIG. 4), wherein each receive descriptor 192 comprises a pointer to a data buffer 194 in the system memory 128. Transmit descriptors include a pointer or a list of pointers, as will be discussed in greater detail supra.

The descriptor management system 130 uses the DMA 126 to read the receive descriptor 192 and retrieve the pointer to the buffer 194. After the frame has been written to the system memory 128, the status generator 134 creates a status word and writes the status word to another area in the system memory 128, which in the present example, is a status ring. The status generator 134 then interrupts the processor 112. The system software (e.g., the network driver 190 in FIG. 4) can then check the status information, which is already in the system memory 128. The status information includes, for example, the length of the frame, what processing was done, and whether or not the various checksums passed.

In transmit operation, the host processor 112 initially dictates a frame transmission along the network 108, and the TCP layer 186 of the operating system (OS) in the host processor 112 is initiated and establishes a connection to the destination. The TCP layer 186 then creates a TCP frame that may be quite large, including the data packet and a TCP header. The IP layer 188 creates an IP header, and an Ethernet (MAC) header is also created, wherein the data packet, and the TCP, IP, and MAC headers may be stored in various locations in the host memory 128. The network driver 190 in the host processor 112 may then assemble the data packet and the headers into a transmit frame, and the frame is stored in one or more data buffers 194 in the host memory 128. For example, a typical transmit frame might reside in four buffers 194: the first one containing the Ethernet or MAC header, the second one having the IP header, the third one the TCP header, and the fourth buffer containing the data. The network driver 190 generates a transmit descriptor 192 that includes a list of pointers to all these data buffers 194.

The frame data is read from the buffers 194 into the controller 102. To perform this read, the descriptor management system 130 reads the transmit descriptor 192 and issues a series of read requests on the host bus 106 using the DMA controller 126. However, the requested data portions may not arrive in order they were requested, wherein the system interface 104 indicates to the DMU 130 the request with which the data is associated. Using such information, the assembly RAM logic 160 organizes and properly orders the data to reconstruct the frame, and may also perform some packing operations to fit the various pieces of data together and remove gaps. After assembly in the assembly RAM 160, the frame is passed to the memory 116 (e.g., a 32 KB RAM in the illustrated example). As the data passes from the assembly RAM 160, the data also passes to the TX parser 162. The TX parser 162 reads the headers, for example, the MAC headers, the IP headers (if there is one), the TCP or UDP header, and determines what kind of a frame it is, and also looks at the control bits that were in the associated transmit descriptor 192. The data frame is also passed to the transmit checksum system 164 for computation of TCP and/or IP layer checksums.

The transmit descriptor 192 may comprise control information, including bits that instruct the transmit checksum system 164 whether to compute an IP header checksum and/or TCP checksum. If those control bits are set, and the parser 162 identifies or recognizes the headers, then the parser 162 tells the transmit checksum system 164 to perform the checksum calculations, and the results are put at the appropriate location in the frame in the memory 116. After the entire frame is loaded in the memory 116, the MAC 122 can begin transmitting the frame, or outgoing security processing (e.g., encryption and/or authentication) can be performed in the IPsec system 124 before transmission to the network 108.

By offloading the transmit checksumming function onto the network controller 102 of the present invention, the host processor 112 is advantageously freed from that task. In order for the host processor 112 to perform the checksum, significant resources must be expended. Although the computation of the checksum is relatively simple, the checksum, which covers the entire frame, must be inserted at the beginning of the frame. In conventional architectures, the host computer makes one pass through the frame to calculate the checksum, and then inserts the checksum at the beginning of the frame. The data is then read another time as it is loaded into the controller. The network controller 102 further reduces the load on the host processor 112 by assembling the frame using direct access to the system memory 128 via the descriptors 192 and the DMA controller 126. Thus, the network controller 102 frees the host processor 112 from several time consuming memory access operations.

In addition to the receive and transmit functions identified above, the network controller 102 may also be programmed to perform various segmentation functions during a transmit operation. For example, the TCP protocol allows a TCP frame to be as large as 64,000 bytes. The Ethernet protocol does not allow data transfers that large, but instead limits a network frame to about 1500 bytes plus some headers. Even in the instance of a jumbo frame option that allows 16,000 byte network frames, the protocol does not support a 64 KB frame size. In general, a transmit frame initially resides in one or more of the data buffers 194 in system memory 128, having a MAC header, an IP header, and a TCP header, along with up to 64 KB of data. Using the descriptor management system 130, the frame headers are read, and an appropriate amount of data (as permitted by the Ethernet or network protocol) is taken and transmitted. The descriptor management system 130 tracks the current location in the larger TCP frame and sends the data block by block, each block having its own set of headers.

For example, when a data transmit is to occur, the host processor 112 writes a descriptor 192 and informs the controller 102. The descriptor management system 130 receives a full list of pointers, which identify the data buffers 194, and determines whether TCP segmentation is warranted. The descriptor management system 130 then reads the header buffers and determines how much data can be read. The headers and an appropriate amount of data are read into the assembly RAM 160 and the frame is assembled and transmitted. The controller 102 then re-reads the headers and the next block or portion of the untransmitted data, modifies the headers appropriately and forms the next frame in the sequence. This process is then repeated until the entire frame has been sent, with each transmitted portion undergoing any selected security processing in the IPsec system 124.

The network controller 102 of the present invention also advantageously incorporates IPSec processing therein. In contrast with conventional systems that offload IPSec processing, the present invention employs on-board IPSec processing, which may be implemented as a single-chip device 102a (FIG. 3). In conventional systems, either the host processor carries out IPSec processing or a co-processor, separate from the network controller, is employed. Use of the host processor is very slow, and in either case, the frame passes at least three times through the memory bus. For example, when a co-processor is used, the frame passes through the bus once as it is read from memory and sent to the co-processor, again as it passes back to the system memory, and a third time as it is sent to the network controller. This processing consumes significant bandwidth on the PCI bus and negatively impacts system performance. A similar performance loss is realized in the receive direction.

IPSec processing has two primary goals: first is to encrypt, or scramble, the data so that an unauthorized person or system cannot read the data. The second goal is authentication, which ensures that the packet is uncorrupted and that the packet is from the expected person or system. A brief discussion of the on-board IPSec processing follows below. The network controller 102 of the present invention takes advantage of security associations (SAs) using the SA memory interface 142, the SA lookup 146, and the SA memory 140. As briefly highlighted above, a security association is a collection of bits that describe a particular security protocol, for example, whether the IPSec portion 124 is to perform an encryption or authentication, or both, and further describes what algorithms to employ. There are several standard encryption and authentication algorithms, so the SA interface 142 and SA lookup 146 indicates which one is to be used for a particular frame. The SA memory 140 in the present example is a private memory, which stores the encryption keys. The SAs are obtained according to an IPSec protocol whereby sufficient information is exchanged with a user or system on the network to decide which algorithms to use and allow both parties to generate the same keys. After the information exchange is completed, the software calls the driver 190, which writes the results into the SA memory 140.

Once the key exchange is complete, the appropriate bits reside in the SA memory 140 that indicate which key is to be used and which authentication algorithm, as well as the actual keys. In transmit mode, part of the descriptor 192 associated with a given outgoing frame includes a pointer into the SA memory 140. When the descriptor management system 130 reads the descriptor 192, it sends a request to the SA memory interface 142 to fetch the key, which then sends the key to the key FIFO 172, that feeds the TX IPSec processing modules 174a and 174b, respectively. When both encryption and authentication are to be employed in transmit, the process is slightly different because the tasks are not performed in parallel. The authentication is a hash of the encrypted data, and consequently, the authentication waits until at least a portion of the encryption has been performed. Because encryption may be iterative over a series of data blocks, there may be a delay between the beginning of the encryption process and the availability of the first encrypted data. To avoid having this delay affect device performance, the exemplary network interface 102 employs two TX IPSec process engines 174a and 174b, wherein one handles the odd numbered frames and the other handles the even numbered frames in the illustrated example.

Prior to performing the IPSec processing, the TX IPsec parser 170 parses the frame headers and looks for mutable fields therein, which are fields within the headers that are not authenticated because they vary as the frame travels over the network 108. For example, the destination address in the IP header varies as the frame goes across the Internet from router to router. The transmit IPsec parser 170 identifies the mutable fields and passes the information to the TX IPSec processors 174, which selectively skip over the mutable field portions of the frames. The processed frames are sent to FIFOs 178a and 178b and subsequently accumulated in the memory 118. The result of the authentication processing is an integrity check value (ICV), which is inserted by insertion block 179 into the appropriate IPsec header as the frame is transmitted from the memory 118 to the network media 108.

In receive mode, a received frame comes into the MAC 122 and the RX parser 144. The RX parser 144 parses the incoming frame up to the IPsec headers and extracts information therefrom. The fields that are important to the RX parser 144 are, for example, the destination IP address in the IP header, the SPI (Security Protocol Index), and a protocol bit that indicates whether an IPSec header is an authentication header (AH) or an encapsulation security protocol (ESP) header. Some of the extracted information passes to the SA lookup block 146. The SA lookup block 146 identifies the appropriate SA and conveys the information to the SA memory interface 142 that retrieves the SA and places it into the key FIFO 152.

The SA lookup block 146 employs an on-chip SPI Table and the off-chip SA memory 140. The SPI Table is organized into 4096 bins, each comprising 4 entries. The entries include the 32-bit SPI, a hash of the destination address (DA), a bit to indicate the protocol, and a bit to indicate whether the entry is used. Corresponding entries in the SA memory contain the full DAs and the SA (two SAs when there is both authentication and encryption). The bin for each entry is determined by a hash of the SPI. To look up an SA, a hash of the SPI from the received frame is used to determine which bin to search. Within the bin, the SA lookup block 146 searches the entries for a match to the full SPI, the destination address hash, and the protocol bit. After searching, the SA lookup block writes an entry to the SA pointer FIFO 148, which either identifies a matching entry or indicates no match was found. A check of the DA address from the SA memory is made just before security processing. If there is no match, security processing is not performed on the frame in question. Based on the entries in the SA pointer FIFO 148, the keys are fetched from the external SA memory 140 and placed in the key FIFO 152. The RX IPSec processor 150 takes the keys that come in from the FIFO 152, reads the corresponding frame data out of the memory 118, and begins processing the frame, as required. For receive processing, decryption and authentication proceed in parallel (on receive, decryption and authentication are not sequential processes), and thus in this example only one RX IPSec processor is used.

The RX IPsec parser 154 parses the headers that follow the ESP header. Any header that follows the ESP header will be encrypted and cannot be parsed until decryption has taken place. This parsing must be completed before TCP/UDP checksums can be computed and before pad bits can be checked. The decrypted data is stored in the memory 116. To perform the TCP/UDP checksums and pad checks without having to store the frame data another time, these functions are carried out by checksum and pad check system 156 while the data is being transferred from the memory 116 to the host memory 128. In addition to the on-board IPSec processing and TCP segmentation highlighted above, the network controller 102 also provides performance improvements in the execution of interrupts. Read latencies are large when a host processor is required to read a register from a network device. These latencies negatively impact system performance. In particular, as the host processor clock speed continues to increase, the disparity between the clock speed and the time it takes to get a response from a network controller over a PCI or other host bus becomes larger. Accordingly, when a host processor needs to read from a network device, the processor must wait a greater number of clock cycles, thereby resulting in opportunity loss.

The network interface 102 avoids many read latencies by replacing read operations with write operations. Write operations are not as problematic because they can take place without involving the processor 112. Thus when write information is sent to a FIFO, as long as the writes are in small bursts, the network controller 102 can take the necessary time to execute the writes without negatively loading the processor. To avoid read operations during a transmit operation, the driver creates a descriptor 192 in the system memory 128 and then writes a pointer to that descriptor to the register 132 of the network controller 102. The DMU 130 of the controller 102 sees the contents in the register 132 and reads the necessary data directly from the system memory 128 without further intervention of the processor 112. For receive operations, the driver software 190 identifies empty buffers 194 in the system memory 128, and writes a corresponding entry to the register 132. The descriptor management system 130 writes to pointers in the transmit descriptor rings to indicate which transmit descriptors 192 have been processed and to pointers in the status rings to indicate which receive buffers 194 have been used.

Unlike conventional architectures that require a host processor to read an interrupt register in the network controller, the present invention generates and employs a control status block (CSB) 196 located in a predetermined region of the system memory 128 (e.g., a location determined upon initialization). The network controller 102 writes to the CSB 196 any register values the system needs. More particularly, after a frame has been completely processed, prior to generating an interrupt, the network controller 102 writes a copy of the interrupt register to the CSB 196. Then the controller 102 asserts the interrupt; thus when the host processor 112 sees the interrupt in the register 132, the received data is already available in the receive data buffer 194.

Figure 5A:
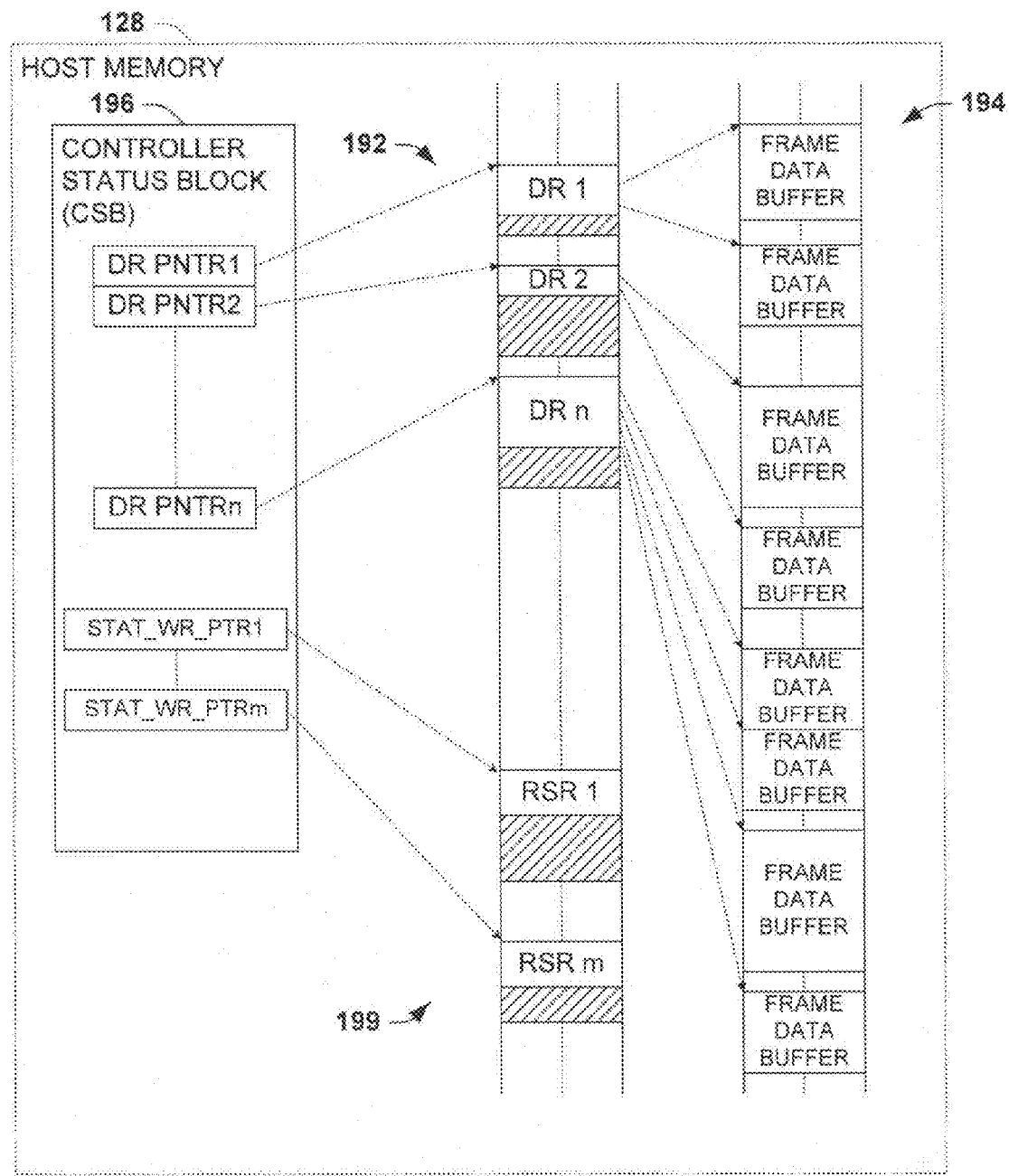
FIG. 5A is a schematic diagram illustrating a control status block in the host system memory with pointers to descriptor rings and receives status rings in the host system of FIG. 2.
Figure 5B:
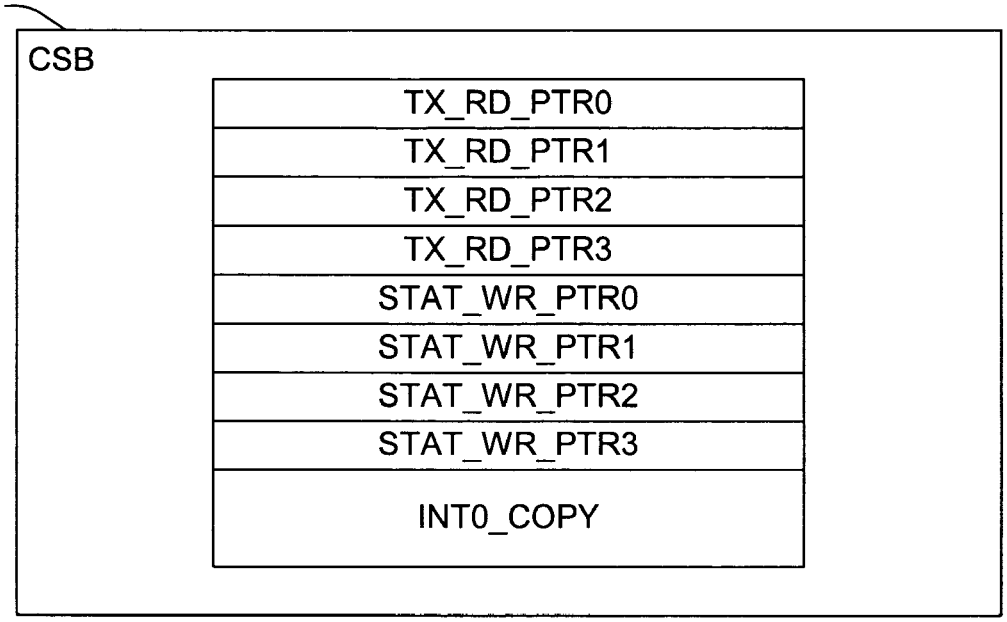
FIG. 5B is a schematic diagram illustrating a controller status block in the host memory of the host system of FIG. 2.
Figure 5C:
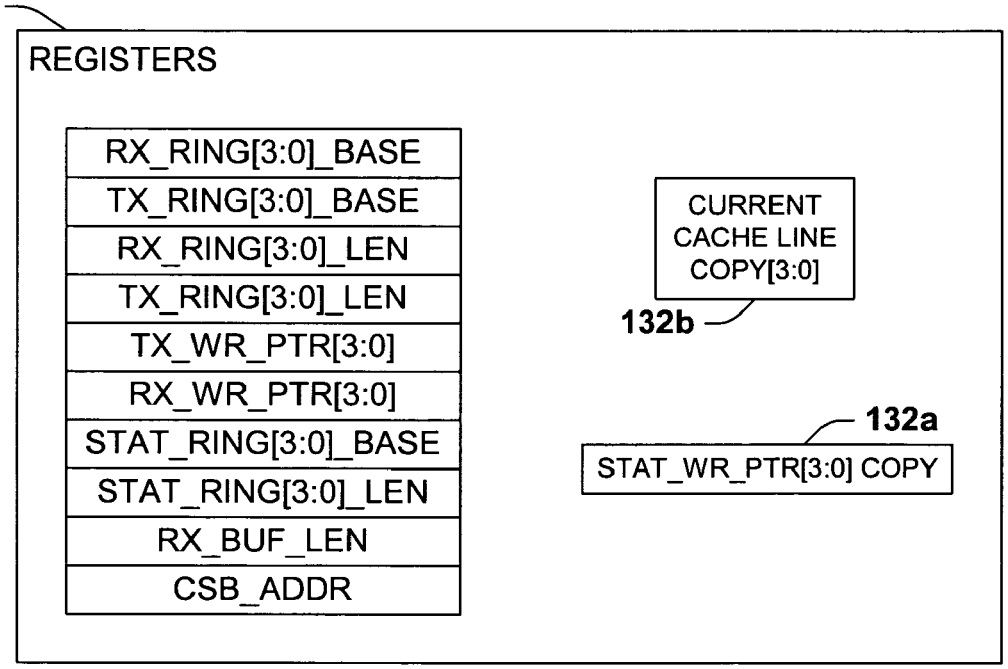
FIG. 5C is a schematic diagram illustrating descriptor management system registers in the network interface system of FIG. 2.
Figure 5D:
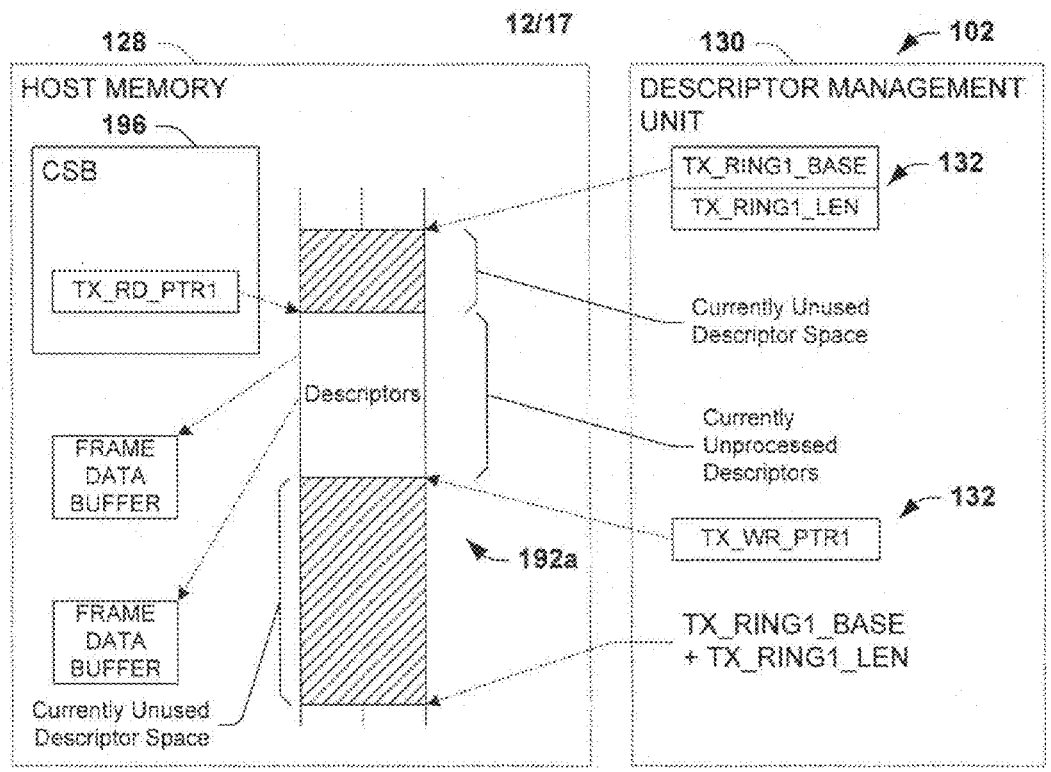
FIG. 5D is a schematic diagram illustrating an exemplary transmit descriptor ring in the host memory and pointer registers in the descriptor management system of the network interface system of FIG. 2.
Figure 5E:
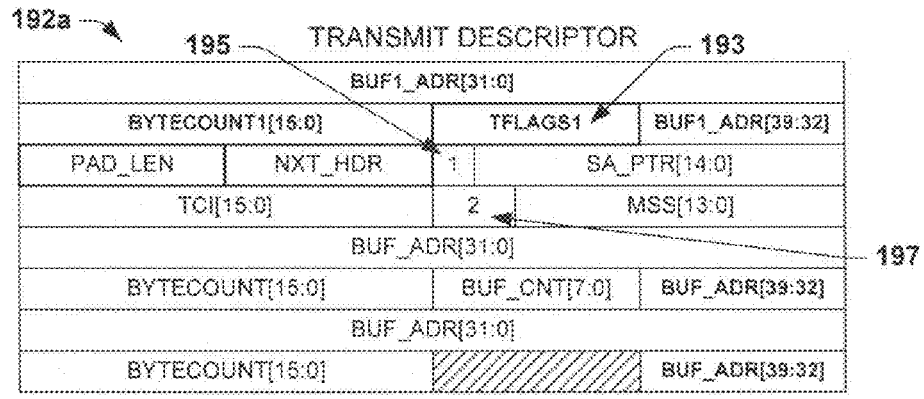
FIG. 5E is a schematic diagram illustrating an exemplary transmit descriptor in the network interface system of FIG. 2.
Figure 5F:
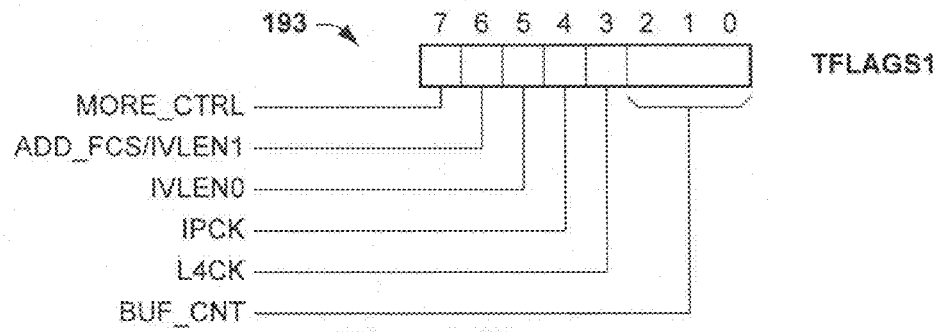
FIG. 5F is a schematic diagram illustrating a transmit flags byte in the transmit descriptor of FIG. 5E.
Figure 5I:
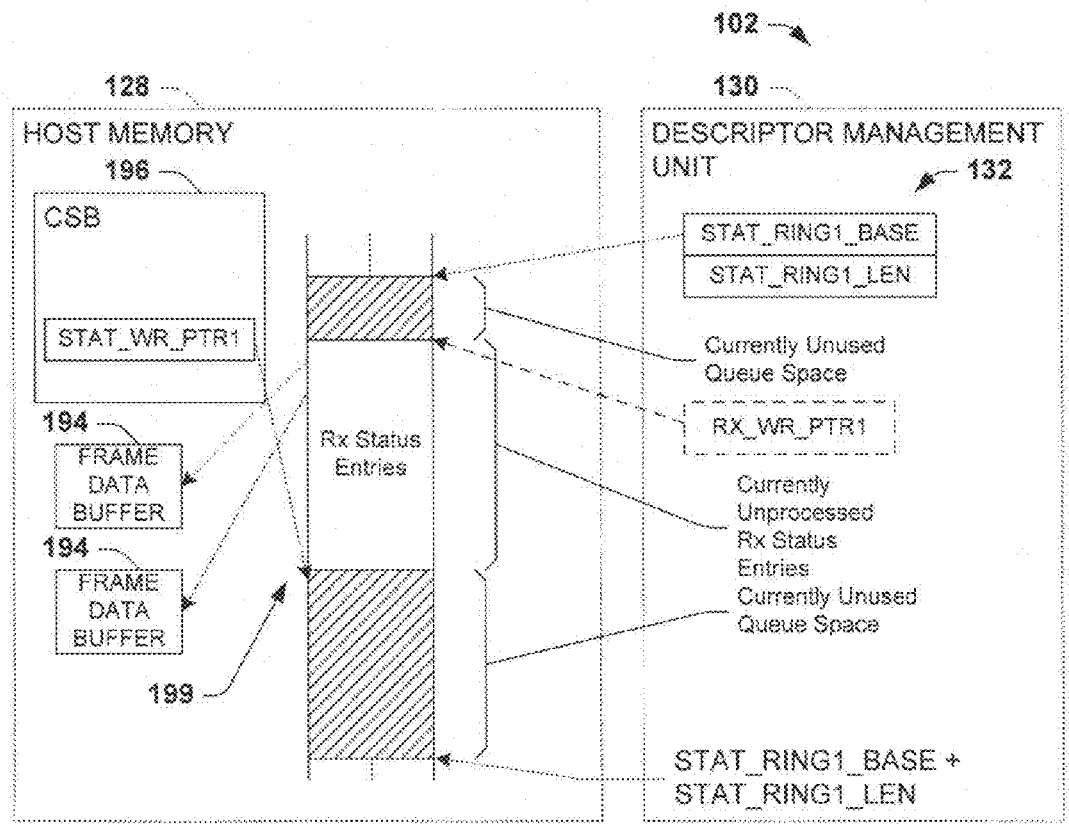
FIG. 5I is a schematic diagram illustrating an exemplary receive status ring in host memory and pointer registers in the descriptor management system in the network interface system of FIG. 2.
Figure 5J:
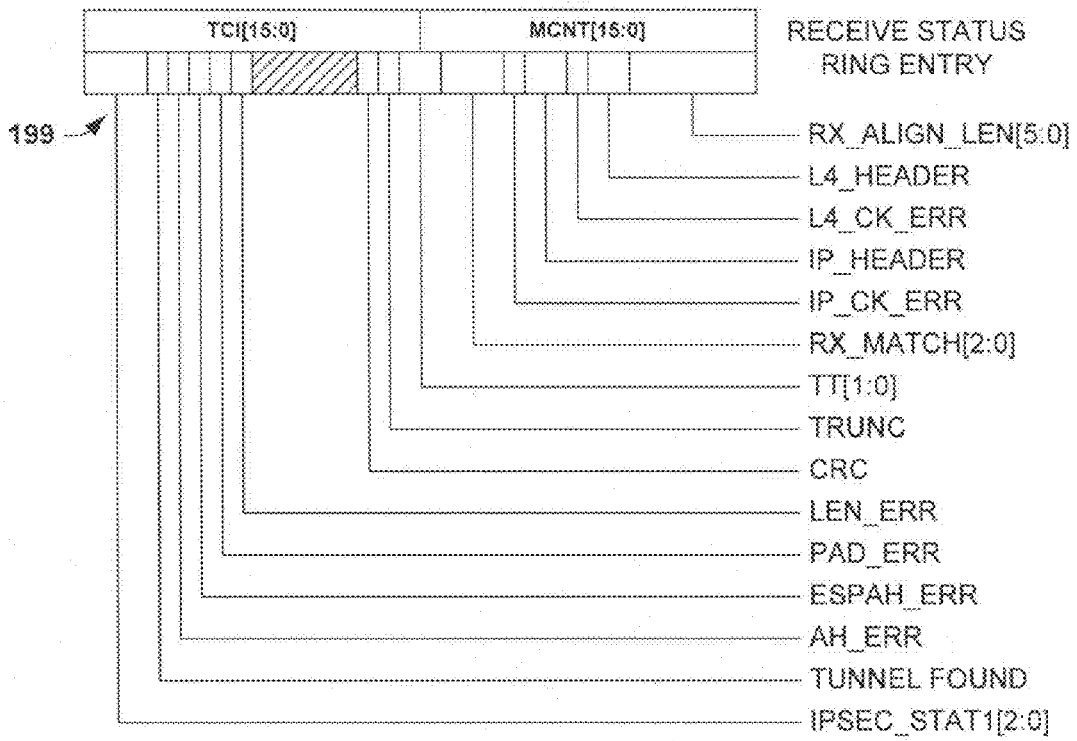
FIG. 5J is a schematic diagram illustrating an exemplary receive status ring entry in the host memory.
Figure 6:
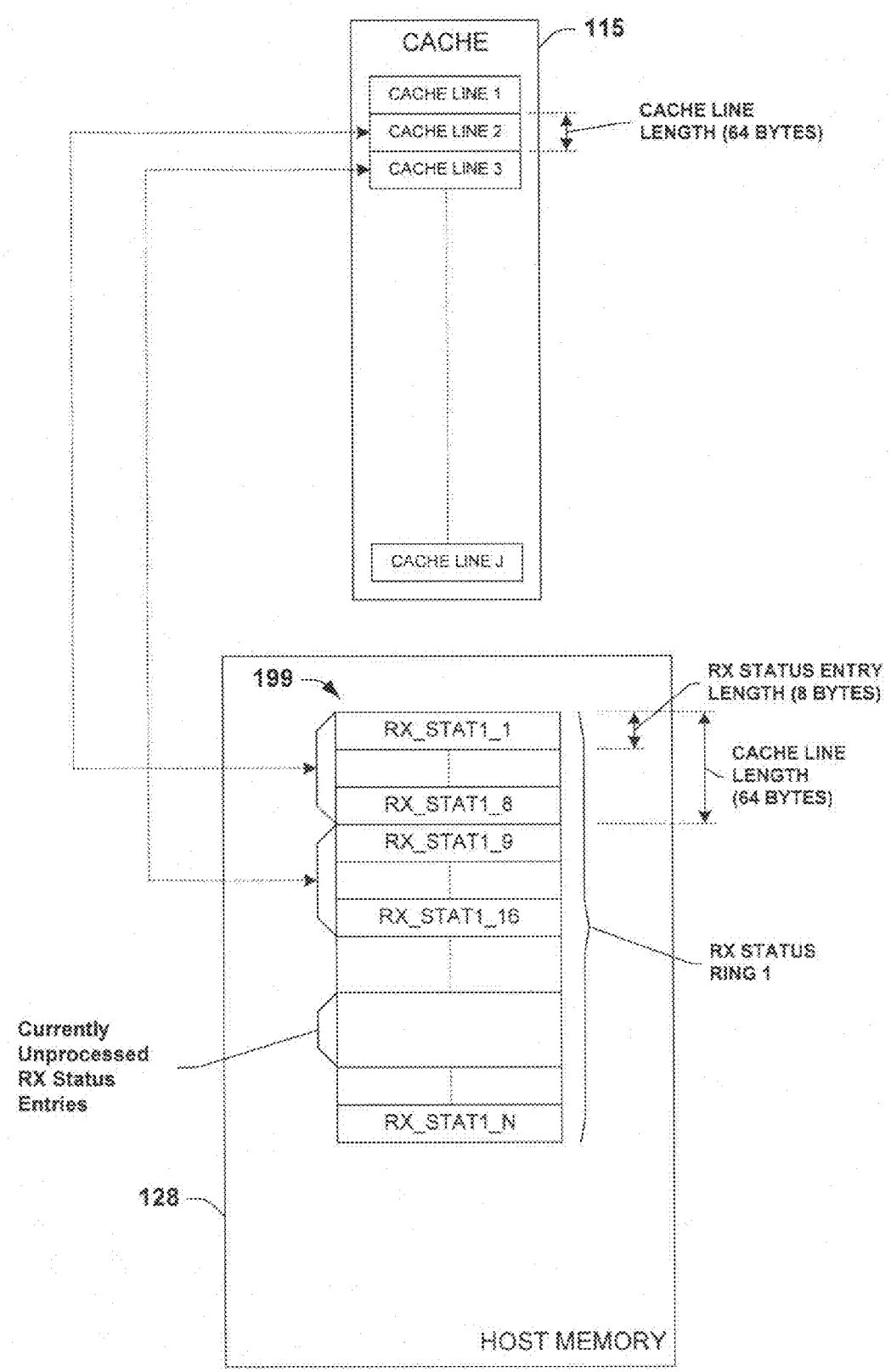
FIG. 6 is a schematic diagram illustrating an exemplary mapping of receive status entries in a receive status ring in host memory with cache lines in the host system cache memory.

Referring now to FIGS. 2, 4, and 5A-5J, further details of the descriptors 192 and the operation of the exemplary controller 102 are illustrated and described below. FIG. 5A illustrates the host memory 128, including the controller status block (CSB) 196, frame data buffers 194, an integer number 'n' descriptor rings DR1 . . . DRn for transmit and receive descriptors 192, and an integer number 'm' receive status rings 199 RSR1 . . . RSRm. The transmit and receive descriptors 192 are stored in queues referred to herein as descriptor rings DR, and the CSB 196 includes descriptor ring pointers DR_PNTR1 . . . DR_PNTRn to the descriptor rings DR. In the exemplary controller 102, four transmit descriptor rings are provided for transmitted frames and four receive descriptor rings are provided for received frames, corresponding to four priorities of network traffic. Each descriptor ring DR in this implementation is treated as a continuous ring structure, wherein the first memory location in the ring is considered to come just after the last memory location thereof. FIG. 5B illustrates pointers and other contents of the exemplary CSB 196 and FIG. 5C illustrates various pointer and length registers 132 in the controller 102. FIG. 5D illustrates further details of an exemplary transmit descriptor ring, FIG. 5H and FIG. 5I show details relating to exemplary receive descriptor and receive status rings, respectively. FIGS. 5E and 5F illustrate an exemplary transmit descriptor, FIG. 5G illustrates an exemplary receive descriptor, and FIG. 5J illustrates an exemplary receive status ring entry.

As shown in FIG. 5A, the descriptors 192 individually include pointers to one or more data buffers 194 in the system memory 128, as well as control information, as illustrated in FIGS. 5E-5G. Synchronization between the controller 102 and the software driver 190 is provided by pointers stored in the controller registers 132, pointers stored in the CSB 196 in the system memory 128, and interrupts. In operation, the descriptor management system 130 in the controller 102 reads the descriptors 192 via the DMA controller 126 of the bus interface 104 in order to determine the memory location of the outgoing frames to be transmitted (e.g., in the data buffers 194) and where to store incoming frames received from the network 108. The CSB 196 is written by the network controller 102 and read by the driver 190 in the host processor 112, and the descriptor management registers 132 are written by the driver 190 and read by the descriptor management system 130 in the controller 102. The exemplary descriptor system generally facilitates information exchange regarding transmit and receive operations between the software driver 190 and the controller 102.

Referring now to FIG. 5B, the exemplary CSB 196 includes pointers into the descriptor and status rings, as well as a copy of the contents of the controller's interrupt register. Transmit pointers TX_RD_PTR0 through TX_RD_PTR3 are descriptor read pointers corresponding to transmit priorities 3 through 0, respectively, which point just beyond the last 64-bit quad word (QWORD) that the controller 102 has read from the corresponding priority transmit descriptor ring. Receive status pointers STAT_WR_PTR0 through STAT_WR_PTR3 are descriptor write pointers corresponding to transmit priorities 3 through 0, respectively, which point just beyond the last QWORD that the controller 102 has written to the corresponding priority receive status ring. The CSB 196 also comprises an interrupt zero register copy INTO_COPY, which is a copy of the contents of an interrupt 0 register in the controller 102.

FIG. 5C illustrates registers 132 related to the descriptor management system 130 in the controller 102. Transmit descriptor base pointers TX_RING[3:0]_BASE include the memory addresses of the start of the transmit descriptor rings of corresponding priority, and the lengths of the transmit descriptor rings are provided in TX_RING[3:0]_LEN registers. Transmit descriptor write pointers are stored in registers TX_WR_PTR[3:0], where the driver software 190 updates these registers to point just beyond the last QWORD that the driver has written to the corresponding transmit descriptor ring. Receive descriptor base pointers RX_RING[3:0]_BASE include the memory address (e.g., in host memory 128) of the start of the receive descriptor rings of corresponding priority, and the lengths of these receive descriptor rings are provided in RX_RING[3:0]_LEN registers. Receive descriptor write pointers RX_WR_PTR[3:0] are updated by the driver 190 to point just beyond the last QWORD that the driver has written to the corresponding receive descriptor ring. Receive status ring base pointer registers STAT_RING[3:0]_BASE indicate the memory address of the receive status rings, and STAT_RING[3:0]_BASE indicate the lengths of the corresponding receive status rings 199 in memory 128. RX_BUF_LEN indicates the number of QWORDS of the receive data buffers 194, where all the receive data buffers 194 are of the same length, and CSB_ADDR indicates the address of the CSB 196 in the host memory 128.

To further illustrate descriptor management operation in data transmission, FIG. 5D illustrates the host memory 128 and the descriptor management system 130, including an exemplary transmit descriptor ring in the host memory 128 and the corresponding descriptor registers 132 in the descriptor management system 130 of the controller 102. In addition, FIGS. 5E and 5F illustrate an exemplary transmit descriptor 192a and control flags thereof, respectively. In the transmit descriptor 102 of FIG. 5E, BUF1_ADR[39:0] includes an address in the host memory 128 of the first data buffer 194 associated with the descriptor 192a. The descriptor 192a also includes transmit flags (TFLAGS1, FIGS. 5E and 5F) 193, which include a MORE_CTRL bit to indicate inclusion of a second 64-bit control word with information relating to virtual local area network (VLAN) operation and TCP segmentation operation. An ADD_FCS/IVLEN1 bit and an IVLEN0 bit are used for controlling FCS generation in the absence of IPsec processing, or to indicate the length of an encapsulation security protocol (ESP) initialization vector (IV) when IPsec security and layer 4 processing are selected. An IPCK bit is used to indicate whether the controller 102 generates a layer 3 (IP layer) checksum for transmitted frames, and an L4CK flag bit indicates whether the controller 102 generates a layer 4 (e.g., TCP, UDP, etc.) checksum. Three buffer count bits BUF_CNT indicate the number of data buffers 194 associated with the descriptor 192a, if less than 8. If more than 8 data buffers 194 are associated with the descriptor 192a, the buffer count is provided in the BUF_CNT[7:0] field of the descriptor 192a.

A BYTECOUNT1[15:0] field in the descriptor 192a indicates the length of the first data buffer 194 in bytes. A PAD_LEN field includes a pad length value from an ESP trailer associated with the frame and a NXT_HDR field provides next header information (protocol data for IPv4) from the ESP trailer if the MORE_CTRL bit is set. Following the NXT_HDR field, an ESP_AUTH bit 195 indicates whether the frame includes an authentication data field in the ESP trailer, and a security association (SA) pointer field SA_PTR [14:0] points to an entry in the external SA memory 140 (FIG. 2) that corresponds to the frame. A two bit VLAN tag control command field TCC[1:0] 197 includes a command which causes the controller 102 to add, modify, or delete a VLAN tag or to transmit the frame unaltered, and a maximum segment size field MSS[13:0] specifies the maximum segment size that the TCP segmentation hardware of the controller 102 will generate for the frame associated with the descriptor 192a. If the contents of the TCC field are 10 or 11, the controller 102 will transmit the contents of a tag control information field TCI[15:0] as bytes 15 and 16 of the outgoing frame. Where the frame data occupies more than one data buffer 194, one or more additional buffer address fields BUF_ADR[39:0] are used to indicate the addresses thereof, and associated BYTECOUNT[15:0] fields are used to indicate the number of bytes in the extra frame buffers 194.

When the network software driver 190 writes a descriptor 192 to a descriptor ring, it also writes to a descriptor write pointer register 132 in the descriptor management system registers 132 to inform the controller 102 that new descriptors 192 are available. The value that the driver writes to a given descriptor management register 132 is a pointer to a 64-bit word (QWORD) in the host memory 128 just past the descriptor 192 that it has just written, wherein the pointer is an offset from the beginning of the descriptor ring measured in QWORDs. The controller 102 does not read from this offset or from anything beyond this offset. When a transmit descriptor write pointer register (e.g., DMU register 132, such as TX_WR_PTR1 in FIG. 5D) has been written, the controller 102 starts a transmission process if a transmission is not already in progress. When the transmission process begins, it continues until no unprocessed transmit descriptors 192 remain in the transmit descriptor rings. When the controller 102 finishes a given transmit descriptor 192, the controller 102 writes a descriptor read pointer (e.g., pointer TX_RD_PTR1 in FIG. 5D) to the CSB 196.

At this point, the descriptor read pointer TX_RD_PTR1 points to the beginning of the descriptor 192 that the controller 102 will read next. The value of the descriptor 192 is the offset in QWORDs of the QWORD just beyond the end of the last descriptor that has been read. This pointer TX_RD_PTR1 thus indicates to the driver 190 which part of descriptor space it can reuse. The driver 190 does not write to the location in the descriptor space that the read pointer points to or to anything between that location and 1 QWORD before the location that the descriptor write pointer TX_WR_PTR1 points to. When the descriptor read pointer TX_RD_PTR1 is equal to the corresponding descriptor write pointer TX_WR_PTR1, the descriptor ring is empty. To distinguish between the ring empty and ring full conditions, the driver 190 insures that there is always at least one unused QWORD in the ring. In this manner, the transmit descriptor ring is full when the write pointer TX_WR_PTR1 is one less than the read pointer TX_RD_PTR1 modulo the ring size.

Referring also to FIG. 5G, an exemplary receive descriptor 192b is illustrated, comprising a pointer BUF_ADR[39:0] to a block of receive buffers 194 in the host memory 128, and a count field BUF_MULT[7:0] indicating the number of buffers 194 in the block, wherein all the receive buffers 194 are the same length and only one buffer is used for each received frame in the illustrated example. If the received frame is too big to fit in the buffer 104, the frame is truncated, and a TRUNC bit is set in the corresponding receive status ring entry 199. FIG. 5H illustrates an exemplary receive descriptor ring comprising an integer number n receive descriptors 192b for storing addresses pointing to n receive data buffers 194 in the host memory 128. The registers 132 in the descriptor management system 130 of the controller 102 include ring base and length registers (RX_RING1_BASE and RX_RING1_LEN) corresponding to the receive descriptor ring, as well as a receive write pointer register (RX_WR_PTR1) including an address of the next unused receive descriptor 192b in the illustrated descriptor ring, and a receive buffer length register (RX_BUF_LEN) including the length of all the buffers 194. The descriptor management system 130 also has registers 132 (STAT_RING1_BASE and STAT_RING1_LEN) related to the location of the receive status ring having entries 199 corresponding to received data within one or more of the buffers 194. The control status block 196 in the host memory 128 also includes a register STAT_WR_PTR1 whose contents provide the address in the receive status ring of the next unused status ring location, wherein the receive status ring is considered empty if STAT_WR_PTR1 equals RX_WR_PTR1.

FIGS. 5I and 5J illustrate further details of an exemplary receive status ring 199 and an entry therefor, respectively. The exemplary receive status ring entry of FIG. 5J includes VLAN tag control information TCI[15:0] copied from the receive frame and a message count field MCNT[15:0] indicating the number of bytes received which are copied in the receive data buffer 194. A three bit IPSEC_STAT1[2:0] field indicates encoding status from the IPsec security system 124 and a TUNNEL_FOUND bit indicates that a second IP header was found in the received data frame. An AH_ERR bit indicates an authentication header (AH) failure, an ESPAH_ERR bit indicates an ESP authentication failure, and a PAD_ERR bit indicates an ESP padding error in the received frame. A CRC bit indicates an FCS or alignment error and a TRUNC bit indicates that the received frame was longer than the value of the RX_BUF_LEN register 132 (FIG. 5C above), and has been truncated. A VLAN tag type field TT[1:0] indicates whether the received frame is untagged, priority tagged, or VLAN tagged, and an RX_MATCH[2:0] field indicates a receive address match type. An IP_CK_ERR bit indicates an IPv4 header checksum error, and an IP header detection field IP_HEADER[1:0] indicates whether an IP header is detected, and if so, what type (e.g., IPv4 or IPv6). An L4_CK-ERR bit indicates a layer 4 (e.g., TCP or UDP) checksum error in the received frame and a layer 4 header detection field L4_HEADER indicates the type of layer 4 header detected, if any. In addition, a receive alignment length field RCV_ALIGN_LEN[5:0] provides the length of padding inserted before the beginning of the MAC header for alignment.

As shown in FIGS. 5H and 5I, in receive operation, the controller 102 writes receive status ring write pointers STAT_

WR_PTR[3:0] (FIG. 5B) to the CSB 196. The network driver software 190 uses these write pointers to determine which receive buffers 194 in host memory 128 have been filled. The receive status rings 199 are used to transfer status information about received frames, such as the number of bytes received and error information, wherein the exemplary system provides four receive status rings 199, one for each priority. When the controller 102 receives an incoming frame from the network 108, the controller 102 uses the next receive descriptor 192 from the appropriate receive descriptor ring to determine where to store the frame in the host memory 128. Once the received frame has been copied to system memory 128, the controller 102 writes receiver status information to the corresponding receive status ring 199. Synchronization between controller 102 and the driver software 190 is provided by the receive status write pointers (STAT_WR_PTR [3:0]) in the CSB 196. These pointers STAT_WR_PTR[3:0] are offsets in QWORDs from the start of the corresponding ring.

When the controller 102 finishes receiving a frame from the network 108, it writes the status information to the next available location in the appropriate receive status ring 199, and updates the corresponding receive status write pointer STAT_WR_PTR. The value that the controller 102 writes to this location is a pointer to the status entry in the ring that it will write to next. The software driver 190 does not read this entry or any entry past this entry. The exemplary controller 102 does not have registers that point to the first unprocessed receive status entry in each ring. Rather, this information is derived indirectly from the receive descriptor pointers RX_WR_PTR. Thus, when the software driver 190 writes to one of the RX_WR_PTR registers 132 (FIG. 5C) in the controller 102, the driver 190 ensures that enough space is available in the receive status ring 199 for the entry corresponding to this buffer 104.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A method for transferring data entries from a peripheral to a data queue in a host memory, the method comprising:
   determining a lower limit on a number of available data entry positions in the data queue; and
   selectively transferring a current data entry to the data queue if the lower limit is greater than or equal to a first value, wherein the first value is a number related to a current cache line size, thereby preventing an overwriting of an unprocessed data entry in the data queue.

2. The method of claim 1, wherein the data entries are incoming data status entries, wherein the data queue is an incoming data status ring in the host memory, wherein determining the lower limit on the number of available data entry positions comprises determining a number of available incoming data status entry positions in the incoming data status ring, wherein selectively transferring the current data entry comprises selectively transferring a current incoming data status entry to the host memory if the lower limit is greater than or equal to the first value.

3. The method of claim 2, wherein the lower limit is determined at least in part according to a number of unused incoming data descriptors.

4. The method of claim 3, wherein the lower limit is determined at least in part according to a number of unused incoming data status entry positions remaining for a current incoming data descriptor.

5. The method of claim 4, wherein the lower limit is determined at least in part according to a sum of the number of unused incoming data descriptors and the number of unused incoming data status entry positions remaining for the current incoming data descriptor.

6. The method of claim 5, wherein determining the lower limit comprises calculating a sum of the number of unused incoming data descriptors and the number of unused incoming data status entry positions remaining for the current incoming data descriptor minus 1.

7. The method of claim 6, wherein the number of unused incoming data descriptors is a difference between an incoming data status pointer and an incoming data descriptor write pointer.

8. The method of claim 7, wherein the first value is a number of unused incoming data status entry positions remaining in a current cache line.

9. The method of claim 7, wherein the first value is a number of incoming data status entries per cache line.

10. The method of claim 2, wherein the first value is a number of unused incoming data status entries positions remaining in a current cache line.

11. The method of claim 2, wherein the first value is a number of incoming data status entries per cache line.

12. The method of claim 2, wherein selectively transferring the current incoming data status entry comprises:
   determining a first portion of the data queue containing the data status entry and any preceding data status entry transferred to the data queue and a remaining portion of the data queue, wherein the first portion and the remaining portion add up to a full cache line length;
   padding the remaining portion of the data.

13. The method of claim 12, wherein the first value is a number of unused incoming data status entries positions remaining in the current cache line.

14. The method of claim 12, wherein the first value is a number of incoming data status entries per cache line.

15. The method of claim 12, wherein determining the lower limit comprises calculating the sum of a number of unused incoming data descriptors and a number of unused incoming data status entry positions remaining for a current incoming data descriptor minus 1.

16. The method of claim 3, wherein the first value is a number of unused incoming data status entries positions remaining in a current cache line.

17. The method of claim 3, wherein the first value is a number of incoming data status entries per cache line.

18. The method of claim 3, wherein the number of unused incoming data descriptors is a difference between an incoming data status pointer and an incoming data descriptor write pointer.

19. The method of claim 1, wherein selectively transferring a current data entry to the data queue is performed by writing the current data to equal a full cache line length.

20. A system for transferring incoming data status entries from a peripheral to a host memory, comprising:

a descriptor management system in the peripheral, the descriptor management system adapted to determine a lower limit, a number of available incoming data status entry positions in an incoming data status ring in the host memory, and to selectively transfer a current incoming data status entry to the data status ring if the lower limit is greater than or equal to a first value, wherein the first value is a number related to a current cache line size, thereby preventing an overwriting of an unprocessed data entry in the host memory.

21. A peripheral system for providing an interface between a host computer and an external device or network, the peripheral system comprising:

a descriptor management system adapted to determine a lower limit, a number of available data entry positions in a data queue in a host memory, and to selectively transfer a current data entry to the data queue if the lower limit is greater than or equal to a first value, wherein the first value is a number related to a current cache line size, thereby preventing an overwriting of an unprocessed data entry in the data queue.

22. The system of claim 21, wherein data entries are incoming data status entries, wherein the data queue is an incoming data status ring in the host memory, and wherein the descriptor management system is adapted to determine the lower limit on a number of available incoming data status entry positions in the incoming data status ring, and to selectively transfer a current incoming data status entry to the host memory if the lower limit is greater than or equal to the first value.

23. The system of claim 22, wherein the descriptor management system determines the lower limit at least in part according to a number of unused incoming data descriptors.

24. The system of claim 23, wherein the descriptor management system determines the lower limit at least in part according to a number of unused incoming data status entry positions remaining for a current incoming data descriptor.

25. The system of claim 24, wherein the descriptor management system determines the lower limit at least in part according to a sum of the number of unused incoming data descriptors and the number of unused incoming data status entry positions remaining for the current incoming data descriptor.

26. The system of claim 25, wherein the descriptor management system determines the lower limit as a sum of the number of unused incoming data descriptors and the number of unused incoming data status entry positions remaining for the current incoming data descriptor minus 1.

27. The system of claim 26, wherein the descriptor management system determines the number of unused incoming data descriptors as a difference between an incoming data status pointer and an incoming data descriptor write pointer.

28. The system of claim 22, wherein the first value is a number of unused incoming data status entry positions remaining in a current cache line.

29. The system of claim 22, wherein the first value is a number of incoming data status entries per cache line.

30. The system of claim 22, wherein the peripheral system is a network controller adapted to provide an interface between a host computer and a network.

31. The method of claim 21, wherein the descriptor management system is further configured to selectively transfer the current data entry to the data queue by writing the current data entry to equal a full cache line length.

* * * * *